US012764431B2

(12) United States Patent
Dai et al.

(10) Patent No.: US 12,764,431 B2
(45) Date of Patent: Oct. 13, 2026

(54) HYBRID IMAGE SENSORS WITH ON-CHIP IMAGE DEBLUR

(71) Applicant: OMNIVISION TECHNOLOGIES, INC., Santa Clara, CA (US)

(72) Inventors: Tiejun Dai, Santa Clara, CA (US); Bo Mu, San Jose, CA (US); Menghan Guo, Shanghai (CN); Wenlei Yang, Shanghai (CN); Qinyi Wang, West Coast Vale (SG); Luis Eduardo Garcia Capel, Jurong East (SG); Rui Jiang, Singapore (SG); Andreas Suess, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 123 days.

(21) Appl. No.: 18/938,208

(22) Filed: Nov. 5, 2024

(65) Prior Publication Data

US 2025/0159371 A1 May 15, 2025

Related U.S. Application Data

(60) Provisional application No. 63/597,638, filed on Nov. 9, 2023.

(51) Int. Cl.
*H04N 25/47* (2023.01)
*H04N 23/45* (2023.01)
(Continued)

(52) U.S. Cl.
CPC ......... *H04N 25/47* (2023.01); *H04N 23/6811* (2023.01); *H04N 23/683* (2023.01);
(Continued)

(58) Field of Classification Search
CPC ............. H04N 23/6811; H04N 23/683; H04N 23/531; H04N 23/843; H04N 23/45;
(Continued)

(56) References Cited

U.S. PATENT DOCUMENTS 11,288,818 B2 3/2022 Daniilidis et al.
11,785,200 B1 10/2023 Smits et al.
(Continued)

OTHER PUBLICATIONS

Pan, et al., "Bringing a Blurry Frame Alive at High Frame-Rate with an Event Camera", retrieved from: https://openaccess.thecvf.com/content_CVPR_2019/papers/Pan_Bringing_a_Blurry_Frame_Alive_at_High_Frame-Rate_With_an_CVPR_2019_paper.pdf, 2019, 6820-6829.
(Continued)

*Primary Examiner* — Kelly L Jerabek
(74) *Attorney, Agent, or Firm* — Dorsey & Whitney LLP

(57) ABSTRACT

Hybrid image sensors with on-chip image deblur (and associated systems, devices, and methods) are disclosed herein. In one embodiment, an image sensor includes (a) a plurality of CMOS image sensor (CIS) pixels configured to capture CIS data corresponding intensity of light incident on CIS pixels of the plurality of CIS pixels, (b) an event vision sensor (EVS) pixel configured to capture EVS data corresponding to events detected in light incident on the EVS pixel, and (c) a deblur circuit configured to generate deblurred image data based on the CIS data and an accumulation of events in the EVS data. The deblur circuit can be configured to compute the accumulation of events, such as using an event-based double integral model.

42 Claims, 12 Drawing Sheets

(51) Int. Cl.

| | |
|---|---|
| ***H04N 23/68*** | (2023.01) |
| ***H04N 23/81*** | (2023.01) |
| ***H04N 23/84*** | (2023.01) |
| ***H04N 25/42*** | (2023.01) |
| ***H04N 25/46*** | (2023.01) |
| ***H04N 25/53*** | (2023.01) |
| ***H04N 25/531*** | (2023.01) |
| ***H04N 25/616*** | (2023.01) |
| ***H04N 25/62*** | (2023.01) |
| ***H04N 25/707*** | (2023.01) |
| ***H04N 25/76*** | (2023.01) |
| ***H04N 25/766*** | (2023.01) |
| ***H04N 25/767*** | (2023.01) |
| ***H04N 25/78*** | (2023.01) |
| ***H04N 25/79*** | (2023.01) |

(52) U.S. Cl.
CPC .......... *H04N 23/81* (2023.01); *H04N 23/843* (2023.01); *H04N 25/42* (2023.01); *H04N 25/46* (2023.01); *H04N 25/53* (2023.01); *H04N 25/616* (2023.01); *H04N 25/62* (2023.01); *H04N 25/707* (2023.01); *H04N 25/76* (2023.01); *H04N 25/766* (2023.01); *H04N 25/767* (2023.01); *H04N 25/78* (2023.01); *H04N 25/79* (2023.01); *H04N 23/45* (2023.01); *H04N 25/531* (2023.01)

(58) Field of Classification Search
CPC ........ H04N 23/81; H04N 25/47; H04N 25/46; H04N 25/707; H04N 25/76; H04N 25/766; H04N 25/616; H04N 25/62; H04N 25/42; H04N 25/767; H04N 25/78; H04N 25/53; H04N 25/79
See application file for complete search history.

(56) References Cited

U.S. PATENT DOCUMENTS

| | | | |
|---|---|---|---|
| 2013/0058587 | A1 | 3/2013 | Wang et al. |
| 2015/0146037 | A1 | 5/2015 | Keelan |
| 2017/0187961 | A1 | 6/2017 | Katz et al. |
| 2018/0189937 | A1 | 7/2018 | Bala et al. |
| 2020/0389582 | A1 | 12/2020 | Herman |
| 2021/0174092 | A1 | 6/2021 | Zhao et al. |
| 2021/0344867 | A1 | 11/2021 | Gao et al. |
| 2022/0284593 | A1* | 9/2022 | Naganuma ................ G06T 7/20 |
| 2022/0329771 | A1 | 10/2022 | Perrone et al. |
| 2023/0030562 | A1* | 2/2023 | Seo ........................ H04N 23/60 |
| 2023/0042364 | A1* | 2/2023 | Ye .......................... H04N 23/45 |
| 2023/0230212 | A1 | 7/2023 | García Capel et al. |
| 2023/0254579 | A1 | 8/2023 | Perrone et al. |
| 2024/0169492 | A1 | 5/2024 | Ollila et al. |
| 2024/0236517 | A1 | 7/2024 | Kim et al. |
| 2025/0159367 | A1 | 5/2025 | Dai et al. |
| 2025/0159370 | A1 | 5/2025 | Dai et al. |
| 2025/0159375 | A1 | 5/2025 | Dai et al. |
| 2025/0159376 | A1 | 5/2025 | Dai et al. |
| 2025/0240538 | A1 | 7/2025 | Liu et al. |
| 2025/0373939 | A1* | 12/2025 | Miyatani ................ H04N 23/45 |
| 2025/0386115 | A1 | 12/2025 | Kim et al. |

OTHER PUBLICATIONS

United States Non-Final Office Action received in U.S. Appl. No. 18/938,080 dated Apr. 15, 2026, pp. all.
Notice of Allowance received in U.S. Appl. No. 18/938,080 dated Feb. 18, 2026, pp. all.
Non-Final office action received in U.S. Appl. No. 18/938,125 dated Feb. 27, 2026, pp. all.
Notice of Allowance received in U.S. Appl. No. 18/937,933 dated Mar. 17, 2026, pp. all.
Non-Final Office Action received in U.S. Appl. No. 18/938,184 dated Feb. 24, 2026, pp. all.
Notice of Allowance received in U.S. Appl. No. 18/938,184 dated Jun. 10, 2026, pp. all.
Non-Final Office Action received in U.S. Appl. No. 18/937,933 dated Jun. 2, 2026, pp. all.

* cited by examiner

HYBRID IMAGE SENSORS WITH ON-CHIP IMAGE DEBLUR

CROSS-REFERENCE TO RELATED APPLICATION(S)

The present application claims the benefit of U.S. Provisional Patent Application No. 63/597,638, filed Nov. 9, 2023, which is incorporated by reference herein in its entirety.

This application contains subject matter related to U.S. patent application Ser. No. 18/938,184, filed Nov. 5, 2024, and titled "HYBRID IMAGE SENSORS WITH ON-CHIP IMAGE DEBLUR AND ROLLING SHUTTER DISTORTION CORRECTION," which is incorporated herein by reference in its entirety.

This application contains subject matter related to U.S. patent application Ser. No. 18/938,125, filed Nov. 5, 2024, and titled "METHODS FOR OPERATING HYBRID IMAGE SENSORS HAVING DIFFERENT CIS-TO-EVS RESOLUTIONS," which is incorporated herein by reference in its entirety.

This application contains subject matter related to U.S. patent application Ser. No. 18/938,080, filed Nov. 5, 2024, and titled "HYBRID IMAGE SENSORS WITH VIDEO FRAME INTERPOLATION," which is incorporated herein by reference in its entirety.

This application contains subject matter related to U.S. patent application Ser. No. 18/937,933, filed Nov. 5, 2024, and titled "HYBRID IMAGE SENSORS WITH ADJUSTABLE CONTRAST THRESHOLDS," which is incorporated herein by reference in its entirety.

TECHNICAL FIELD

This disclosure relates generally to image sensors. For example, several embodiments of the present technology relate to hybrid image sensors with on-chip image deblur capabilities that utilize event-based vision sensor (EVS) data to deblur complementary metal oxide semiconductor (CMOS) image sensor (CIS) data before outputting deblurred image frames (e.g., to downstream components of a corresponding imaging system).

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following FIGURES, in which like or similar reference numbers are used to refer to like or similar components throughout unless otherwise specified.

Figure 1:
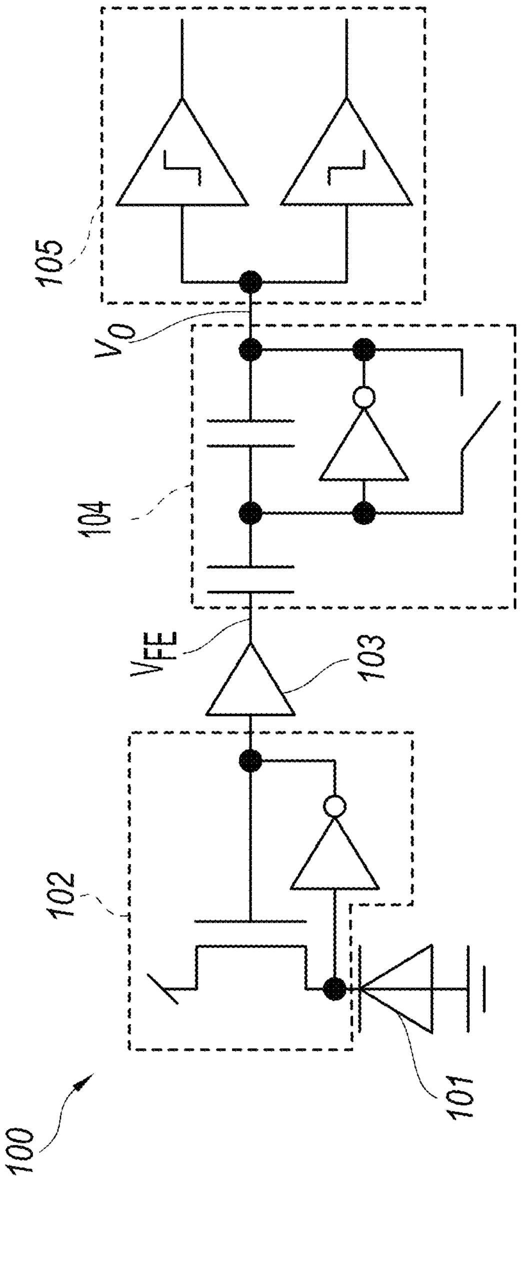
FIG. 1 is a partially schematic diagram of an EVS pixel configured in accordance with various embodiments of the present technology.

Skilled artisans will appreciate that elements in the FIGURES are illustrated for simplicity and clarity and are not necessarily drawn to scale. For example, the dimensions of some of the elements in the FIGURES may be exaggerated relative to other elements to aid in understanding of various aspects of the present technology. In addition, common but well-understood elements or methods that are useful or necessary in a commercially feasible embodiment are often not depicted in the FIGURES, or described in detail below, to avoid unnecessarily obscuring the description of various aspects of the present technology.

DETAILED DESCRIPTION

The present disclosure relates to hybrid image sensors with on-chip image deblur capabilities, such as on-chip, event-guided deblur capabilities. For example, several embodiments of the present technology described in detail below are directed to image sensors that (a) synchronize CIS data captured by CIS pixels with corresponding EVS/event data captured by one or more EVS pixels, (b) accumulate event data over an event accumulation period aligned with an exposure period of the CIS pixels, and (c) deblur the CIS data using the accumulated event data to generate deblurred image/video data that can then be output from the image sensors. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the FIGURES. It will be understood that the spatially relative terms are intended to encompass different orientations of a device or system in use or operation, in addition to the orientation depicted in the FIGURES. For example, if a device or system illustrated in the FIGURES is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) than illustrated in the FIGURES, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. Overview

An active pixel sensor employs an array of pixels that are used to capture intensity images/video of an external scene. More specifically, the pixels are used to obtain CIS information (e.g., intensity information) corresponding to light from the external scene that is incident on the pixels. CIS information obtained during an integration period is read out at the end of the integration period and used to generate a corresponding intensity image of the external scene.

The pixels of an active pixel sensor typically have an integration time that is globally defined. Thus, pixels in an array of an active pixel sensor typically have an identical integration time, and each pixel in the array is typically converted into a digital signal regardless of its content (e.g., regardless of whether there has been a change in an external scene that was captured by a pixel since the last time the pixel was read out). As such, a relatively large amount of memory and power can be required to operate an active pixel sensor at high frame rates. Thus, due in part to memory and power constraints, it is difficult to use an active pixel sensor on its own to obtain intensity images/video of an external scene at ultra-high frame rates.

Moreover, when motion or other changes occur in an external scene during an integration period, motion artifacts can be observed as blurring in the resulting intensity image of the external scene. Blurring can be especially prominent in low light conditions in which longer exposure times are used. As such, active pixel image sensors on their own are not great at obtaining sharp intensity images/video of highly dynamic scenes.

In comparison, event vision sensors (e.g., event driven sensors or dynamic vision sensors) employ EVS pixels that are usable to obtain non-CIS information (e.g., contrast information, intensity changes, event data) corresponding to light from an external scene that is incident on those EVS pixels. Event vision sensors read out an EVS pixel and/or convert a corresponding pixel signal into a digital signal only when the EVS pixel detects a change (e.g., an event) in the external scene. In other words, EVS pixels of an event vision sensor that do not detect a change in the external scene are not read out and/or pixel signals corresponding to such EVS pixels are not converted into digital signals (thereby saving power). Thus, each EVS pixel of an event vision sensor can be independent from other EVS pixels of the event vision sensor, and only EVS pixels that detect a change in the external scene need be read out and/or have their corresponding pixel signals converted into digital signals. As a result, unlike active pixel sensors with synchronous integration times, event vision sensors do not suffer from limited dynamic ranges and are able to accurately capture high-speed motion. Thus, event visions sensors are often more robust than active pixel sensors in low lighting conditions and/or in highly dynamic scenes because they are not affected by under/over exposure or motion blur associated with a synchronous shutter. Stated another way, event vision sensors can be used to provide ultra-high frame rates and to accurately capture high-speed motions.

Hybrid image sensors employ an array of pixels that includes a combination of (i) active (CIS) pixels usable to obtain CIS information corresponding to light from an external scene and (ii) EVS pixels usable to obtain non-CIS information corresponding to light from the external scene. Such hybrid image sensors are therefore able to simultaneously capture (a) intensity images/video of an external scene and (b) events occurring within the external scene. Event data captured by the EVS pixels can be used to resolve/mitigate (i) the low frame-rate intensity image problem discussed above and (ii) the blurry effect inherent in intensity images captured using CIS pixels in the presence of motion. For example, using an event-based double integral (EDI) model, high frame-rate intensity images/video of an external scene can be reconstructed from a single (e.g., blurry) intensity image and its event sequence.

A description of the EDI model is provided here for the sake of clarity and understanding. Instantaneous intensity (or irradiance/flux) at a pixel (x, y) at any time t, related to the rate of photon arrival at that pixel (x, y), is known as a latent image $L_{xy}(t)$. The latent image $L_{xy}(t)$ is not directly output from a hybrid image sensor corresponding to the pixel (x, y). Instead, the hybrid image sensor outputs (i) an intensity image (e.g., a blurry image) that represents a combination of multiple latent images (including the latent image $L_{xy}(t)$) captured by one or more CIS pixels over an exposure period, and (ii) a sequence of events captured during the exposure period that record changes in intensity between the latent images. A description of how events can be detected is provided below, followed by a description of how detected events may be used to obtain the latent image $L_{xy}(t)$ for a pixel. Because each pixel of an image sensor can be treated separately, the subscripts x, y are omitted from the equations and variables that follow for readability. One should appreciate, however, that the latent image $L_{xy}(t)$ for a pixel of a pixel array at a given time represents a portion of a latent image $L_F(t)$ for the full pixel array at that given time. Thus, the latent image $L_F(t)$ for the full pixel array at the given time can be obtained by determining the latent image $L_{xy}(t)$ of every pixel in the array at that given time.

FIG. 1 is a partially schematic diagram of an EVS pixel 100 configured in accordance with various embodiments of the present technology. The EVS pixel 100 is also referred to herein as an "event sensing front-end circuit." As shown, the EVS pixel 100 includes a photosensor 101, a logarithmic amplifier 102, a buffer 103, a difference detector 104, and up/down comparators 105.

The photosensor 101 is configured to photogenerate image charge (photocurrent) in response to incident light. Photocurrent photogenerated by the photosensor 101 at time t is directly proportional to the latent image L(t) (e.g., irradiance of the incident light) at time t, as indicated by Equation 1 below:

$$I_{photo}(t) \propto L(t) \qquad \text{Equation 1}$$

As discussed above, the latent image L(t) denotes the instantaneous intensity at the EVS pixel 100 at time t, related to the rate of photon arrival at the EVS pixel 100.

Photocurrent photogenerated by the photosensor 101 is fed into the logarithmic amplifier 102. In turn, the logarithmic amplifier 102 transduces (a) the photocurrent that is linearly proportional to the latent image L(t) into (b) a voltage $V_{FE}$ that is logarithmically dependent on the latent image L(t), as indicated by Equation 2 below:

$$V_{FE} \propto \ln[I_{photo}(t)]) \propto \ln[L(t)] \qquad \text{Equation 2}$$

Temporal contrast (also referred to herein as "linear contrast") is defined as a change in light contrast on the EVS pixel 100 (e.g., on the photosensor 101) relative to a reference time $t_0$, and is provided by Equation 3 below:

$$C_{lin} = \frac{L(t) - L(t_0)}{L(t_0)} = \frac{L(t)}{L(t_0)} - 1 \qquad \text{Equation 3}$$

The difference detector 104 of the EVS pixel 100 is used to monitor temporal contrast of light incident on the photosensor 101. More specifically, when reset, the difference detector 104 samples the voltage $V_{FE}$ at a reference time to and thereafter generates an output $V_O$ shown by Equation 4 below:

$$V_O = \alpha + \beta \cdot \ln\left(\frac{I_{photo}(t)}{I_{photo}(t_0)}\right) \qquad \text{Equation 4}$$

The output $V_O$ of the difference detector 104 tracks a change of the voltage $V_{FE}$ over time relative to the voltage $V_{FE}$ at the reference time to. As shown by Equation 5 below, as the voltage $V_{FE}$ changes over time, the corresponding change in the output $V_O$ of the difference detector 104 is proportional to the log of the temporal contrast:

$$\Delta V_O = \beta \cdot \ln\left(\frac{L(t)}{L(t_0)}\right) = \beta \cdot \ln(1 + C_{lin}) = \beta \cdot C_{log} \qquad \text{Equation 5}$$

The output $V_O$ of the difference detector 104 is fed into the up/down comparators 105. In turn, the up/down comparators 105 compare the output $V_O$ to corresponding threshold voltages $V_{+TH}$ and $V_{-TH}$ that are given by Equation 6 below in which $C_{log\text{-}TH}$ is a contrast threshold parameter determining whether an event should be recorded. As shown by Equation 7 below, the up comparator detects an event when the output $V_O$ of the difference detector 104 exceeds the threshold voltage $V_{+TH}$. As shown by Equation 8 below, the down comparator detects an event when the output $\Delta V_O$ of the difference detector 104 is less than the threshold voltage $V_{-TH}$.

$$V_{\pm TH} = \pm \beta \cdot C_{log-TH} \qquad \text{Equation 6}$$

$$\Delta V_O \geq V_{+TH} \Rightarrow \text{event} \Rightarrow \ln\left(\frac{L(t)}{L(t_0)}\right) \geq C_{log-TH} \qquad \text{Equation 7}$$

$$\Delta V_O \leq V_{-TH} \Rightarrow \text{event} \Rightarrow \ln\left(\frac{L(t)}{L(t_0)}\right) \leq C_{log-TH} \qquad \text{Equation 8}$$

Using the log ratio rule, Equations 7 and 8 provide Equations 9 and 10, respectively, that specify when an event is detected by the EVS pixel 100:

$$\ln[L(t_i)] \geq \ln[L(t_{i-1})] + C_{log-TH} \qquad \text{Equation 9}$$

$$\ln[L(t_i)] \leq \ln[L(t_{i-1})] - C_{log-TH} \qquad \text{Equation 10}$$

Time $t_i$ in the above equations corresponds to each time an event is detected, and time $t_{i-1}$ denotes the timestamp of the previous event. When an event is triggered in an EVS pixel, $L(t_{i-1})$ is updated to a new intensity level (e.g., by resetting the difference detector 104 such that the difference detector 104 newly samples the voltage $V_{FE}$). Detection of an event at time $t_i$ therefore indicates that a change in log intensity exceeding the contrast threshold parameter $C_{log\text{-}TH}$ has occurred relative to the previous event detected at time $t_{i-1}$. In other words, each detected event indicates intensity changes between latent images (a current latent image $L(t_i)$ and a previous latent image $L(t_{i-1})$). Therefore, Equations 9 and 10 above provide Equation 11 below in which c is equivalent to $C_{log\text{-}TH}$ and $p_i$ is event polarity:

$$\ln[L(t_{\square})] = \ln[L(t_{i-1})] + c \cdot p_i \qquad \text{Equation 11}$$

Event polarity $p_i$ at each time $t_i$ is given by Equation 12 below. A polarity $p_i$ of +1 denotes an increase in irradiance of light incident on the photosensor 101, and a polarity $p_i$ of −1 denotes a decrease in irradiance of light incident on the photosensor 101.

$$p_i = \begin{Bmatrix} +1 \text{ if } \ln\left(\frac{L(t_i)}{L(t_i - 1)}\right) \geq C_{log\text{-}TH} \\ -1 \text{ if } \ln\left(\frac{L(t_i)}{L(t_i - 1)}\right) \leq C_{log\text{-}TH} \end{Bmatrix} \qquad \text{Equation 12}$$

Figure 2:
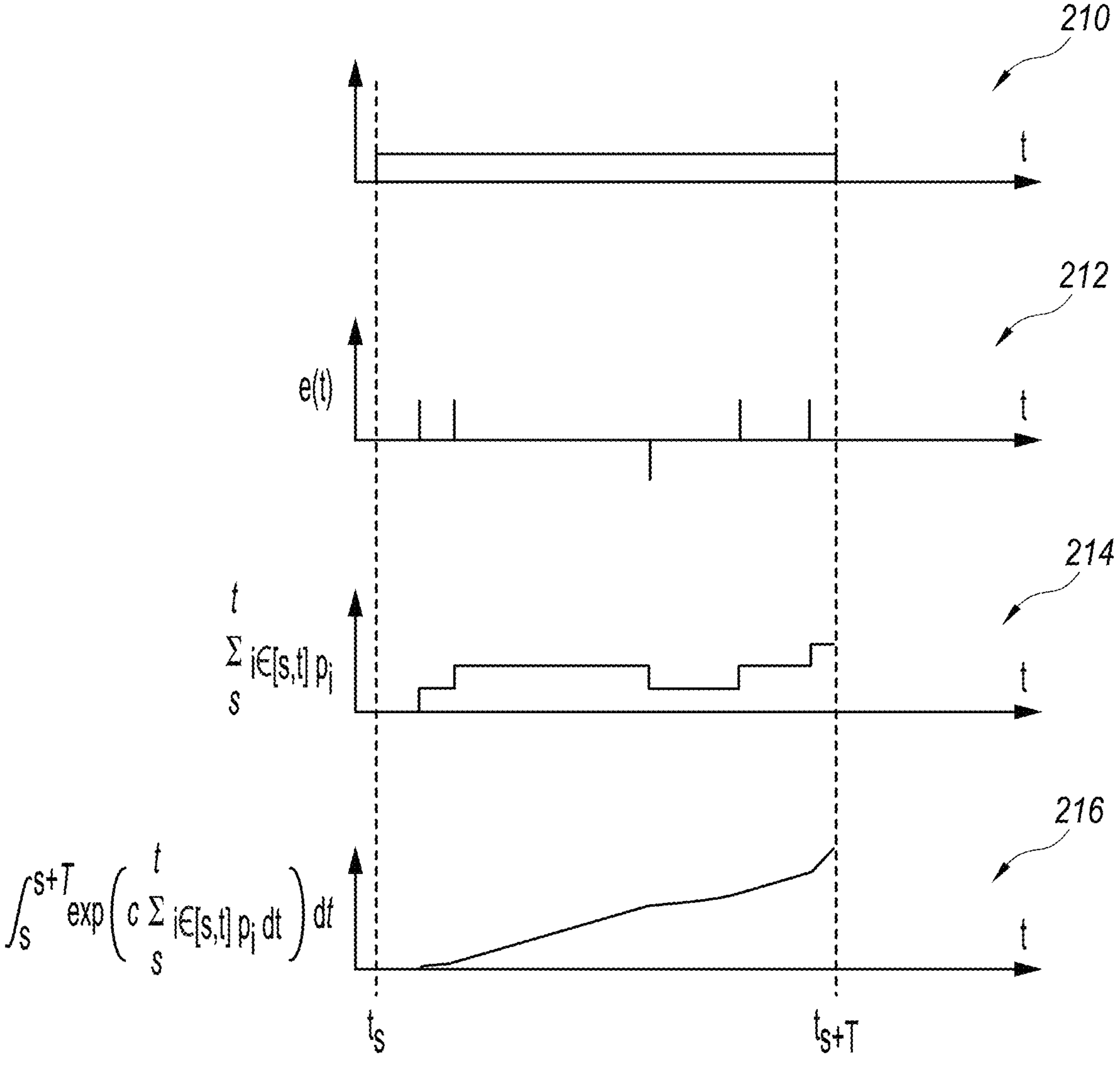
FIG. 2 are plots illustrating (a) an exposure period, (b) a sequence of event pulses formed into a time continuous signal, (c) sums of the event pulses of the sequence over time, and (d) the integral of the sum of the event pulses of the sequence over time.

Events detected at each time $t_i$ can be modeled using a unit impulse (Dirac function 8) multiplied by a corresponding polarity $p_i$. Detected events can be defined as a function of continuous time. For example, FIG. 2 illustrates various plots 210, 212, 214, and 216. Plot 210 illustrates exposure periods for rows of CIS pixels in a pixel array, for one image frame. A rolling shutter is used such that exposure periods and readouts for the rows of pixels in the pixel array are staggered. The exposure period for a top two rows of the CIS pixel array extends between time to and time $t_{0+T}$, and the exposure period for a bottom two rows of the CIS pixel array extends between time $t_s$ and the time $t_{s+T}$. Plot 212 illustrates a sequence of events detected by an EVS pixel that corresponds to the bottom two rows of the CIS pixel array. More specifically, the sequence of events detected between time to and time $t_{s+T}$ is plotted as a time continuous signal e(t) comprising a sequence of unit impulses. The time continuous signal e(t) is modeled by Equation 13 below:

$$e(t) = p_i \cdot \delta(t - t_i) \qquad \text{Equation 13}$$

Because each event detected by the EVS pixel indicates a change between latent images captured at different times, a proportional change in intensity on pixels of the bottom two rows of the CIS pixel array over the exposure period for these pixel rows can be provided by the sum (or combination) of events detected by the corresponding EVS pixel between time $t_s$ and time t, as shown in Equation 14 below:

$$E(t) = \int_{\square}^{t} e(\xi)d\xi = \sum\nolimits_{i \in [s,t]} p_i \qquad \text{Equation 14}$$

Plot 214 of FIG. 2 illustrates the time continuous signal E (t) that represents a sum of the events in the time continuous signal e(t) of the plot 212 of FIG. 2 between time $t_s$ and time $t_{s+T}$ corresponding to the exposure period for the bottom two rows of the CIS pixel array.

Using Equations 11 and 12 above, one can determine ln $[L(t_i)]$ when ln $[L(t_{i-1})]$ is known. Therefore, given a sequence of events specified by time continuous signal e(t), and assuming that c in Equation 11 above remains constant, one can (in the linear domain) determine a latent image L(t) at any given time t for CIS pixels of the bottom two rows of the array by incrementing over all events from a starting latent image L(s) at time $t_s$ to time t, as shown by Equation 15 below:

$$L(t) = L(s)\exp(cE(t)) = L(s)\exp\left(c\int_{\square}^{t} e(\xi)d\xi\right) = L(s)\exp\left(c\sum\nolimits_{i \in [s,t]} p_i\right) \qquad \text{Equation 15}$$

As discussed above with reference to Equation 1, photocurrent photogenerated by the photosensor 101 is proportional to the latent image L(t) (or irradiance) at time t. Thus, the integral of the latent image L(t) over an exposure period extending between time $t_s$ and time $t_{s+T}$ corresponds to "charge" and can be related to frame information captured by CIS pixels of a frame-based image sensor. Moreover, as discussed above, a blurry intensity image captured by a frame-based image sensor can be regarded as the integral of a sequence of latent images over—or a combination of multiple latent images captured by the frame-based image sensor within—an exposure period extending between time $t_s$ and time $t_{s+T}$ during which events are accumulated. Therefore, a blurry frame B captured by a frame-based image sensor can, using Equation 15 above, be expressed by Equation 16 below:

$$B = \frac{1}{T}\int_{s}^{s+T} L(t)dt = \frac{L(s)}{T}\int_{s}^{s+T} \exp\left(c\int_{s}^{t} e(\xi)d\xi\right)dt = \frac{L(s)}{T}\int_{s}^{s+T} \exp\left(c\sum\nolimits_{i \in [s,t]} p_i\right)dt \qquad \text{Equation 16}$$

Plot 216 of FIG. 2 illustrates the integral of the time continuous signal E (t) of the plot 214 of FIG. 2 over time from the time $t_s$ to the time $t_{s+T}$.

Equation 16 above is known as the EDI model and provides a relation between a blurry frame B captured by a frame-based image sensor and a latent image L(s) at a CIS pixel at time $t_s$ (corresponding to the start of the frame/exposure period for that CIS pixel). This relation can be rearranged to find the latent image L(s), as shown by Equation 17 below:

$$L(s) = \frac{T \cdot B}{\int_{s}^{s+T} \exp\left(c\sum\nolimits_{i \in [s,t]} p_i\right)dt} \qquad \text{Equation 17}$$

The latent image L(s) in Equation 17 above takes the interpretation of a deblurred frame based on (a) the blurry frame B captured by a frame-based image sensor and (b) events detected by an EVS pixel across a corresponding exposure period. In other words, because events detected by the EVS pixel during an exposure period indicate changes between latent images captured by one or more active (CIS) pixels during the exposure period, the detected events can be used to perform event-guided deblur.

Many event-guided-deblur solutions use an active image sensor to capture CIS data and a separate event vision sensor to capture EVS data. Such dual-sensor configurations, however, have several shortcomings, such as parallax errors introduced because the sensors are not collocated, complexities in spatial and temporal synchronization of the CIS data and the EVS data, and added costs (e.g., due to the need for two pairs of lenses, packages, etc.). Although these shortcomings can be overcome by using hybrid image sensors, all existing event-guided-deblur solutions known to the inventors of the present disclosure output CIS data and EVS data to application processors external to the hybrid image sensors, for the application processors to perform event-guided deblur off-chip. Such off-chip, event-guided-deblur solutions suffer from several additional shortcomings, many of which are discussed below with reference to FIG. 3.

Figure 3:
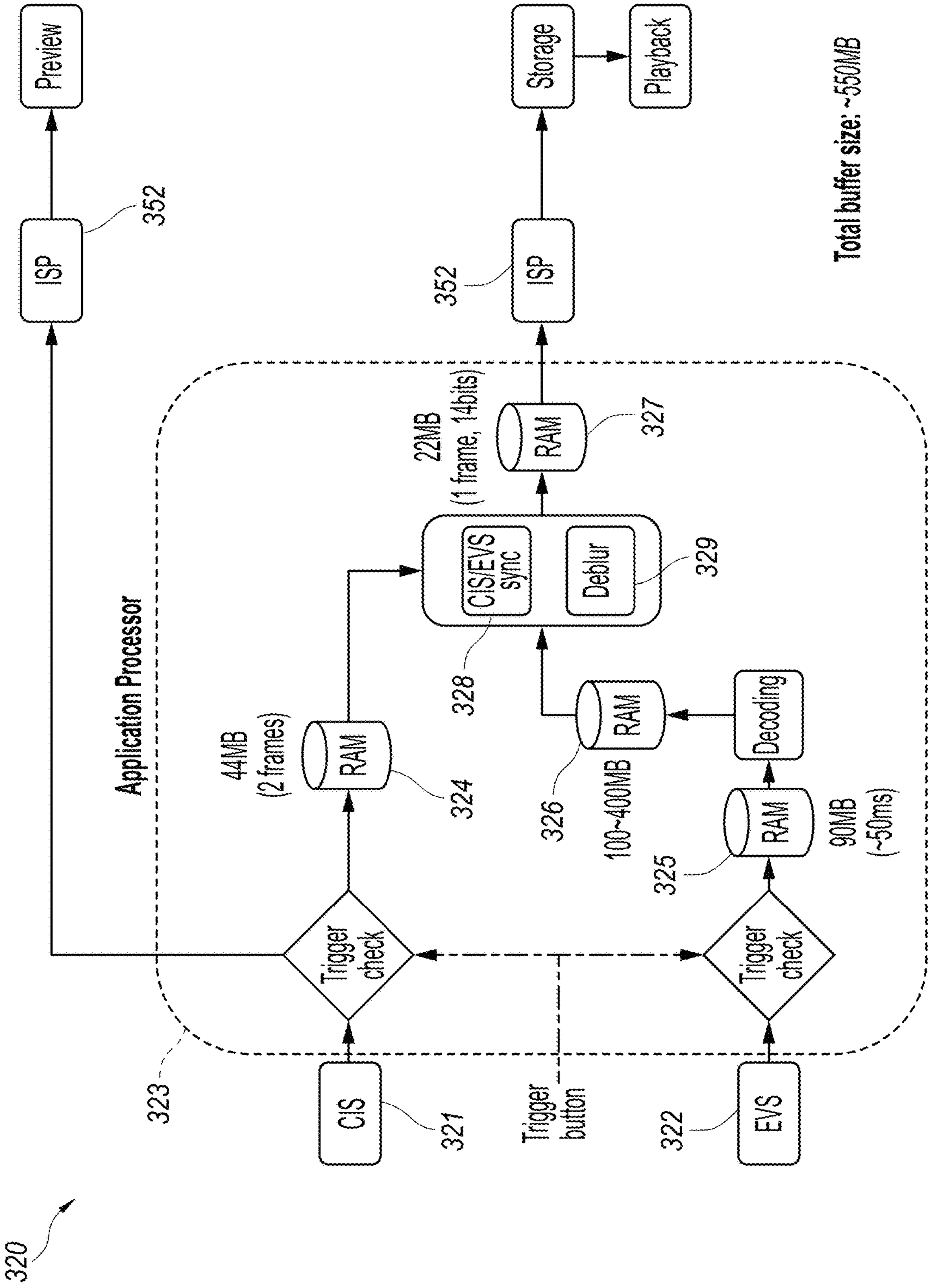
FIG. 3 is a partially schematic diagram illustrating an example of an imaging system with off-chip image deblur.

FIG. 3 is a partially schematic diagram illustrating an example of an imaging system 320 that performs event-guided deblur off-chip. As shown, CIS data 321 and EVS data 322 is output to an application processor 323 of the imaging system 320 from either (a) a hybrid image sensor (not shown) of the imaging system 320 or (b) an active pixel sensor (not shown) and a separate event vision sensor (not shown) of the imaging system 320. The application processor 323 is configured to (a) perform event-guided deblur of the CIS data 321 using the EVS data 322 and (b) output deblurred image frames to an image signal processor 352.

One drawback of off-chip, event-guided-deblur solutions is the need for a relatively large amount of memory. For example, to perform event-guided deblur, the application processor 323 uses a first buffer 324, a second buffer 325, a third buffer 326, and a fourth buffer 327. More specifically, the first buffer 324 is used to store two frames of CIS image data. One of the frames is used to sync the CIS data 321 with the EVS data 322 at a CIS/EVS sync block 328 of the application processor 323, and the other of the frames is deblurred by the application processor 323 using the EVS data 322 at a deblur block 329 of the application processor 323. In one example, the first buffer 324 can be approximately 44 MB in size for a 12-megapixel image sensor. The second buffer 325 is used to store the EVS data 322 prior to decoding, and the third buffer 326 is used to store the EVS data 322 after decoding. In one example, the second buffer 325 can be configured to store approximately 50 ms of the EVS data 322 and can therefore be approximately 90 MB in size. As such, depending on the decoding, the third buffer 326 can be approximately 100-400 MB in size. The fourth buffer 327 can be configured to store a deblurred image frame and can therefore be approximately 22 MB in size for a 12-megapixel image sensor. As such, continuing with the above examples, the application processor 323 can require approximately 550 MB of memory to perform event-guided deblur of the CIS data 321 using the EVS data 322.

Other drawbacks of off-chip, event-guided deblur solutions include that such solutions (i) suffer from relatively large latency and (ii) cannot support real-time video. For example, as shown in FIG. 3, the CIS data 321 and the EVS data 322 is output to the external application processor 323 (causing a 1-frame delay). In addition, the application processor 323 introduces additional delays while performing the event-guided beblur calculation. For example, the application processor 323 can take up to 1 second to process one 12-megapixel image. As a result, the off-chip, event-guided deblur solution illustrated by FIG. 3 is only able to process still images, meaning that this solution cannot support real-time video.

Still other drawbacks of off-chip, event guided deblur solutions include (i) the requirement for relatively high input/output (IO) bandwidth between the image sensor(s) and an external application processor, and (ii) consumption of a relatively large amount of power. For example, as shown in FIG. 3, both the CIS data 321 and the EVS data 322 are output from the image sensor(s) to the application processor 323, which requires a relatively high IO throughput (e.g., approximately 20 Gbps for a 12-megapixel, 30 fps image sensor). Such high IO throughput and long data processing time (e.g., up to 1 second, as discussed above) leads to consumption of a relatively large amount of power.

One other drawback of off-chip, event guided deblur solutions is the complexity of the interface between the image sensor(s) and downstream components of an imaging system. For example, rather than outputting deblurred image frames, the image sensor(s) (not shown) of the imaging system 320 of FIG. 3 output(s) raw CIS data 321 and raw EVS data 322, requiring a relatively complex application processor 323 and corresponding interface with the image sensor(s).

To address these concerns, several embodiments of the present technology described herein are generally directed to hybrid image sensors with on-chip image deblur capabilities. For example, several embodiments of the present technology described in detail below are directed to image sensors with the following on-chip capabilities: (a) synchronization of CIS data captured using active (CIS) pixels with EVS data captured using EVS pixels and/or (b) image deblur. In some embodiments, the on-chip image deblur can include on-chip, event-guided deblur.

The present technology is expected to offer several advantages. For example, in comparison to the off-chip, event-guided deblur solutions discussed above, the present technology is expected to reduce or minimize (a) an amount of memory required to perform image deblur; (b) latency associated with performing image deblur; (c) required IO bandwidth/throughput; and/or (d) an amount of power required to perform image deblur. As such, the present technology is also expected to support real-time video in addition to the processing of still images. Moreover, because image deblur is performed on-chip (e.g., entirely or partially internal the image sensor, and/or without first outputting or needing to first output raw CIS data and/or raw EVS data from the image sensor), images sensors configured in accordance with various embodiments of the present technology are able to output deblurred image frames (e.g., in addition to or in lieu of raw CIS data and/or raw EVS data), meaning that the interface between such images sensors and downstream components of corresponding imaging systems can be simplified in comparison to the off-chip, event-guided deblur solutions discussed above.

Figure 4A:
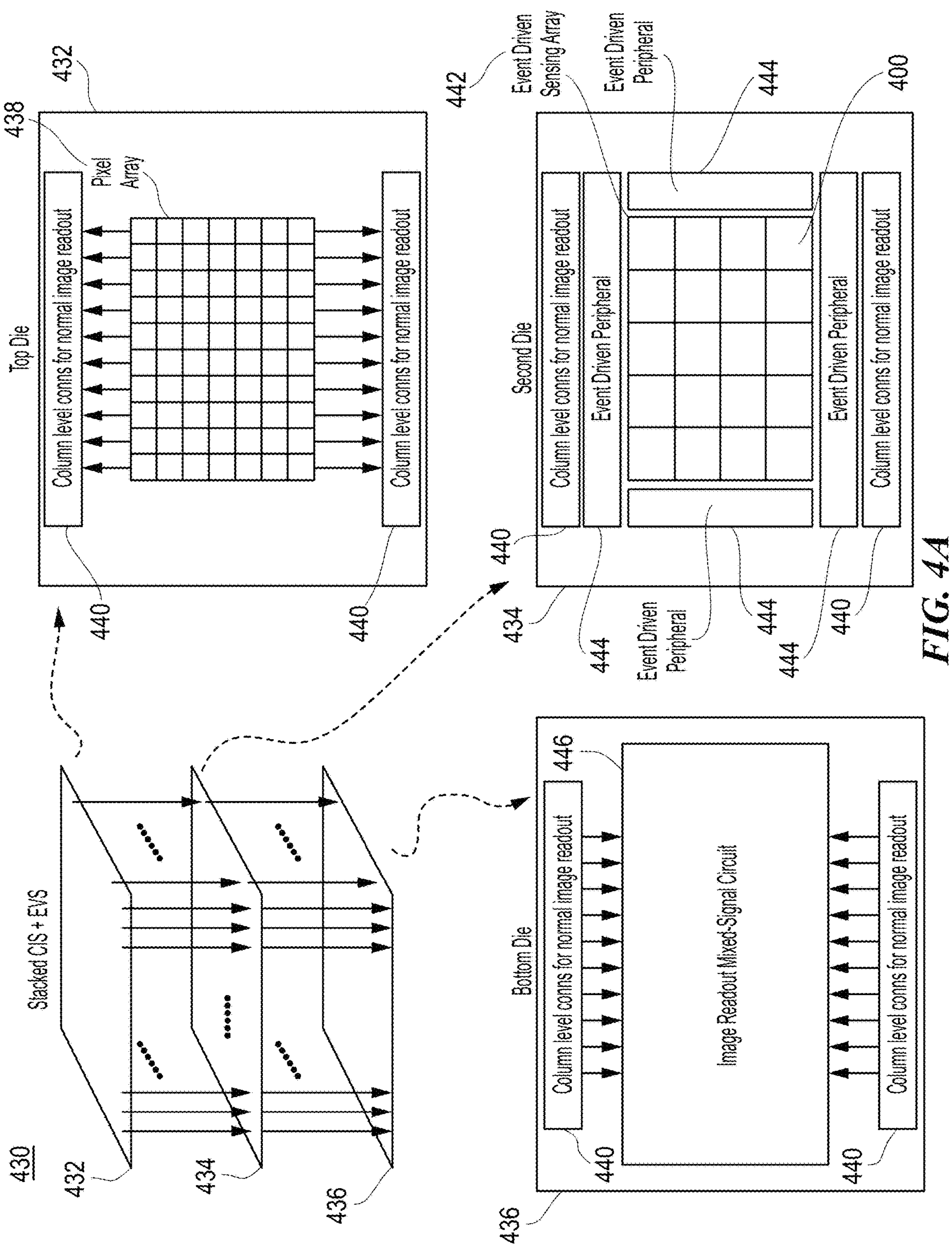
FIG. 4A is a partially schematic diagram of a stacked hybrid complementary metal oxide semiconductor (CMOS) image sensor (CIS) and event-based vision sensor (EVS) system, configured in accordance with various embodiments of the present technology.

B. Selected Embodiments of Hybrid Image Sensors with On-Chip Image Deblur, and Associated Systems, Devices, and Methods FIG. 4A is a partially schematic diagram of a stacked complementary metal oxide semiconductor (CMOS) image sensor (CIS) with an event-based vision sensor (EVS) system 430 ("the stacked system 430" or "the image sensor 430"), configured in accordance with various embodiments of the present technology. As shown, the stacked system 430 includes a first die 432, a second die 434, and a third die 436 that are stacked and coupled together in a stacked chip scheme. In some embodiments, the first die 432, the second die 434, and the third die 436 are semiconductor dies that include a suitable semiconductor material (e.g., silicon). In illustrated embodiment, the first die 432 (also referred to herein as the "top die") includes a pixel array 438. The third die 436 (also referred to herein as the "bottom die") includes image readout circuitry 446 (also referred to herein as "image readout mixed-signal circuitry"). The image readout circuitry 446 can be coupled to the pixel array 438 of the first die 432 through column level connections for normal image readout 440. In some embodiments, the column level connections for normal image readout 440 are implemented from column bitlines of the pixel array 438 with through silicon vias (TSVs) that extend between the first die 432 and the third die 436, and that are routed through the second die 434.

In some embodiments, the pixel array 438 is a two-dimensional (2D) array including a plurality of pixel cells (also referred to as "pixels") that each includes at least one photosensor (e.g., at least one photodiode) exposed to incident light. As shown in the illustrated embodiment, the pixels are arranged into rows and columns. Some of the pixels can be configured as CMOS image sensor (CIS) pixels that are configured to acquire image data of a person, place, object, etc., which can then be used to render images and/or video of a person, place, object, etc. For example, each CIS pixel is configured to photogenerate image charge in response to the incident light. After each CIS pixel has acquired its image charge, the corresponding analog image charge data can be read out by the image readout circuitry 446 in the third die 436 through the column bit lines. In some embodiments, the image charge from each row of the pixel array 438 may be read out in parallel through column bit lines by the image readout circuitry 446. As discussed in greater detail below, others of the pixels of the pixel array 438 can be configured as event vision sensor (EVS) pixels.

The image readout circuitry 446 in the third die 436 can include amplifiers, analog to digital converter (ADC) circuitry, associated analog support circuitry, associated digital support circuitry, etc., for normal image readout and processing. In some embodiments, the image readout circuitry 446 may also include event driven readout circuitry, which will be described in greater detail below. In operation, the photogenerated analog image charge signals are read out from the pixel cells of pixel array 438, amplified, and converted to digital values in the image readout circuitry 446. In some embodiments, image readout circuitry 446 may read out a row of image data at a time. In other examples, the image readout circuitry 446 may read out the image data using a variety of other techniques (not illustrated), such as a serial readout or a full parallel readout of all pixels simultaneously. The image data may be stored or even manipulated by applying post image effects (e.g., crop, rotate, remove red eye, adjust brightness, adjust contrast, and the like).

In the illustrated embodiment, the second die 434 (also referred to herein as the "middle die") includes an event driven sensing array 442 that is coupled to at least some of the pixels (e.g., EVS pixels) of the pixel array 438 in the first die 432. In some embodiments, the event driven sensing array 442 is coupled to the pixels of the pixel array 438 through hybrid bonds between the first die 432 and the second die 434. The event driven sensing array 442 can include an array of event driven circuits. In some embodiments, each one of the event driven circuits in the event driven sensing array 442 is coupled to at least one of the plurality of pixels of the pixel array 438 through hybrid bonds between the first die 432 and the second die 434 to asynchronously detect events that occur in light that is incident upon the pixel array 438 in accordance with the teachings of the present disclosure.

In some embodiments, corresponding event detection signals are generated by the event driven circuits (e.g., that are similar to the event sensing front-end circuit illustrated in FIG. 1) in the event driven sensing array 442. The event detection signals can be received and processed by event driven peripheral circuitry 444 that, in some embodiments, is arranged around the periphery of the event driven sensing array 442 in the second die 434, as is shown in FIG. 4A. The embodiment illustrated in FIG. 4A also illustrates column level connections for normal image readout 440 that are routed through the second die 434 between the first die 432 and the third die 436.

Figure 4B:
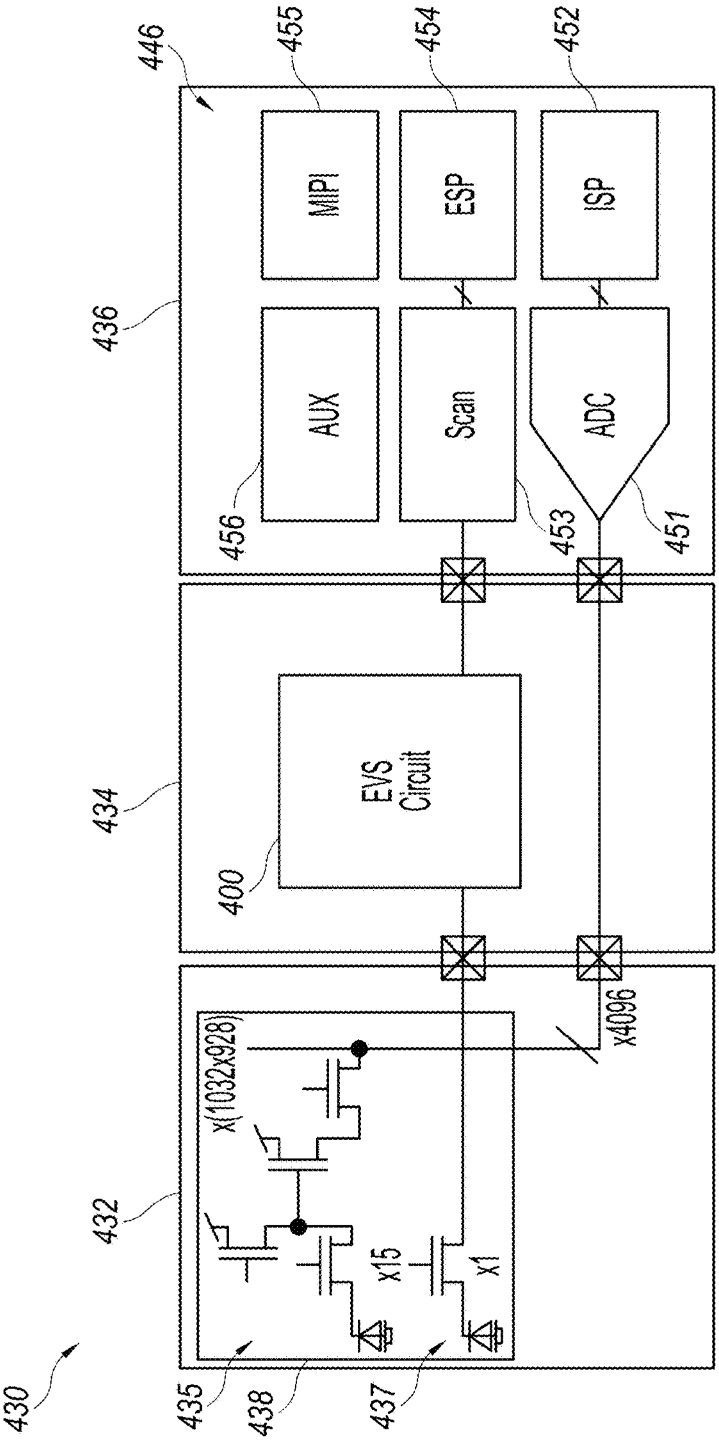
FIG. 4B is a partially schematic diagram of a specific example of the system of FIG. 4A.

FIG. 4B is a partially schematic diagram of a specific example of the stacked system 430 of FIG. 4A. As shown in FIG. 4B, the stacked system 430 includes the pixel array 438 on the first die 432 (only a portion of the pixel array 438 is shown in FIG. 4B), an event driven circuit 400 of the event driven sensing array 442 on the second die 434, and image readout circuitry 446 on the third die 436. The image readout circuitry 446 includes analog-to-digital converters 451 ("the ADC 451"), an image signal processor 452, scan readout circuitry 453, an event signal processor 454, a synchronous communications interface 455 (e.g., a mobility industry processor interfaces (MIPI) transmitter and/or receiver), and various auxiliary circuits 456. As discussed in greater detail below, the image readout circuitry 446 can also include a deblur circuit (e.g., for performing event-guided deblur of CIS data).

Figure 4C:
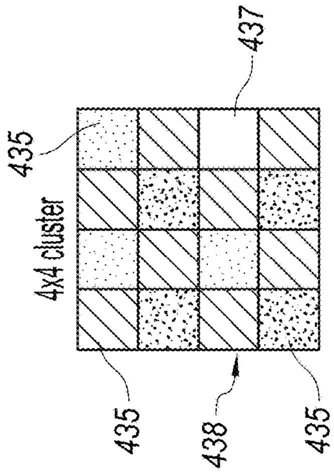
FIG. 4C is a partially schematic diagram of a 4×4 pixel cluster configured in accordance with various embodiments of the present technology.

The portion of the pixel array 438 shown in FIG. 4B corresponds to a 4×4 cluster of pixels in the pixel array 438. Such a cluster can be repeated across the pixel array 438. In the illustrated embodiment, fifteen (15) of the pixels of the cluster are configured as active (CIS) pixels 435 to capture CIS information (e.g., intensity information) corresponding to light incident on photosensors of those pixels. In addition, one of the pixels of the cluster is configured as an EVS pixel 437 to capture non-CIS information (e.g., contrast information, event data) corresponding to light incident on a photosensor of the EVS pixel 437. FIG. 4C illustrates a specific example of the 4×4 pixel cluster of FIG. 4B in which the CIS pixels 435 are arranged in a Bayer pattern to capture CIS (frame) information corresponding to light incident on the cluster, and the EVS pixel 437 is arranged to detect EVS (asynchronous event) information corresponding to light incident on the cluster. The CIS pixels 435, of course, can be arranged in another pattern besides a Bayer pattern in other embodiments of the present technology.

Referring again to FIG. 4B, the CIS pixels 435 of the cluster and the EVS pixel 437 of the cluster are read out independently. More specifically, CIS information captured by the CIS pixels 435 are read out through the second die 434 to the ADC 451 on the third die 436 using corresponding row/column control circuitry (not shown). Non-CIS information captured by the EVS pixel 437 is read out to the event driven circuit 400 on the second die 434 using corresponding row/column control circuitry (not shown), and events detected by the event driven circuit 400 are read out by the scan readout circuitry 453 on the third die 436. The CIS information captured by the CIS pixels 435 of the pixel array 438 is frame-based and can be readout out from the CIS pixels 435 row-by-row at the end of an exposure period. By contrast, the non-CIS information captured by the EVS pixel 437 is used by the event driven circuit 400 to asynchronously detect/trigger events, and the events can be read out according to a row scan readout scheme or a column scan readout scheme. Row scan readout schemes are discussed in greater detail below.

In some embodiments, row/column control circuitry corresponding to the CIS pixels 435 can be allocated on a same die as—or a different die from—the die (e.g., the third die 436) on which the ADC 451 is allocated. In these and other embodiments, row/column control circuitry corresponding to the EVS pixels 437 can be allocated on a same die as—or a different die from—the die (e.g., the third die 436) on which the scan readout circuitry 453 is allocated. In these and still other embodiments, the ADC 451 and/or the row/column control circuitry corresponding to the CIS pixels 435 can be allocated on a same die as—or a different die from—the die (e.g., the third die 436) on which the scan readout circuitry 453 and/or the row/column control circuitry corresponding to the EVS pixel 437 is/are allocated.

In the illustrated embodiment, the EVS pixel 437 is dedicated to capturing non-CIS (EVS) information while the CIS pixels 435 are dedicated to capturing CIS information. In other embodiments, the EVS pixel 437 and/or one or more of the CIS pixels 435 can be switched between being configured to capture CIS information and non-CIS information. This can enable the stacked system 430 to operate in a CIS-only mode in which all of the pixels 435 and the pixel 437 are used to capture CIS information, an EVS-only mode in which all of the pixels 435 and the pixel 437 are used to capture non-CIS (EVS) information, and/or a hybrid CIS and EVS mode in which a first subset of the pixels 435, 437 are used to capture CIS information and a second subset of the pixels 435, 437 are used to capture non-CIS (EVS) information.

In some embodiments, the event driven circuit 400 on the second die 434 has a same die size as the 4×4 pixel cluster on the first die 432. In other embodiments, the event driven circuit 400 can have a different die size from the 4×4 pixel cluster. Additionally, or alternatively, although the ratio of CIS pixels to EVS pixels is 15:1 in the 4×4 pixel cluster, other ratios of CIS pixels to EVS pixels (e.g., 14:2, 12:4, 8:8, 4:12, 2:14, 15:1) are possible and fall within the scope of the present technology. Moreover, although the EVS pixel 457 of FIG. 4B corresponds to a 4×4 pixel cluster, other arrangements (e.g., an EVS pixel corresponding to 1×1 pixels clusters, 4×2 pixel clusters, etc.) are possible and within the scope of the present technology. Furthermore, although one row of EVS pixels (e.g., the row including the EVS pixel 457) corresponds to four rows of CIS pixels in FIG. 4B, other arrangements are possible and within the scope of the present technology. For example, each row of EVS pixels can correspond to (a) one row of CIS pixels, (b) to two rows of CIS pixels, (c) to three rows of CIS pixels, or (d) to more than four rows of CIS pixels. Examples of other CIS pixel resolutions to EVS pixel resolutions are described in the application titled "METHODS FOR OPERATING HYBRID IMAGE SENSORS HAVING DIFFERENT CIS-TO-EVS RESOLUTIONS," which has been incorporated by reference herein in its entirety above.

Figure 5:
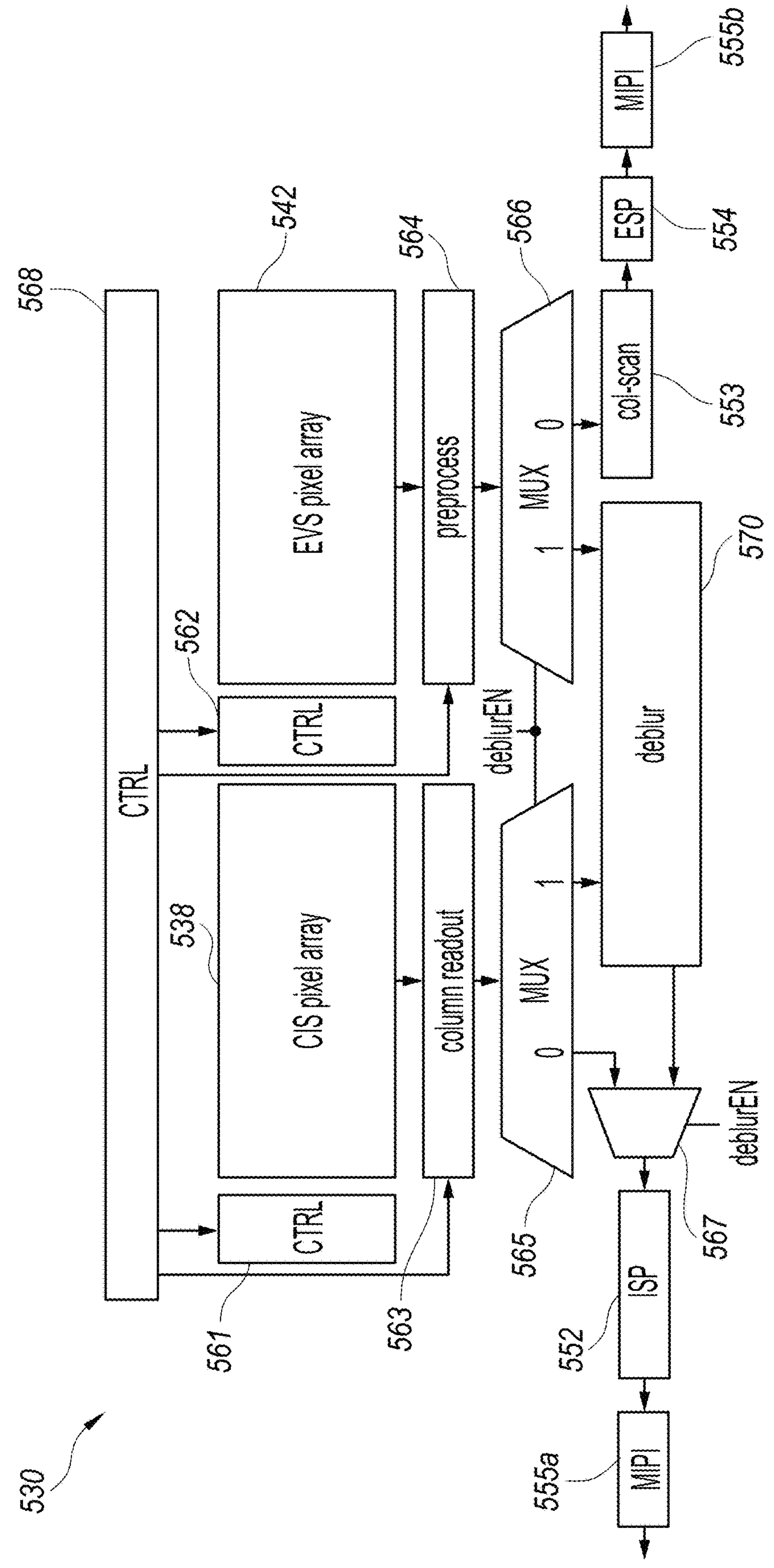
FIG. 5 is a partially schematic block diagram of an image sensor configured in accordance with various embodiments of the present technology.

As discussed above, event data captured using EVS pixels can be used to perform event-guided deblur of CIS (frame) information captured using CIS pixels. To this end, FIG. 5 is a partially schematic block diagram of an image sensor 530 that includes on-chip image deblur capabilities and that is configured in accordance with various embodiments of the present technology. The image sensor 530 can be an example of the stacked system 430 of FIG. 4A and/or FIG. 4B described above, or of other image sensors configured in accordance with the present technology.

As shown, the image sensor 530 includes a CIS pixel array 538 (e.g., similar to the pixel array 438 of FIG. 4A, FIG. 4B, and/or FIG. 4C) and/or an event driven sensing array 542 (e.g., similar to the event driven sensing array 442 of FIG. 4A, FIG. 4B, and/or FIG. 4C). The image sensor 530 further includes (a) row/column control circuitry 561 and column readout circuitry 563 for controlling operation and readout of CIS pixels included in the pixel array 538, and (b) row/column control circuitry 562 for controlling operation and readout of EVS pixels included in the event driven sensing array 542. The image sensor 530 may optionally include a preprocessing circuit 564 for performing various operations (e.g., denoising) on EVS data read out from EVS pixels of the event driven sensing array 542.

The image sensor 530 further includes a common control block 568 for synchronizing operation of the pixel array 538 with operation of the event driven sensing array 542. More specifically, although CIS pixels of the pixel array 538 and EVS pixels of the event driven sensing array 542 include their own row/column control circuitry and are independently read through their own readout circuitry, the common control block synchronizes operation (e.g., reset, exposure start times, exposure end times) of the CIS pixels, the EVS pixels, the row/column control circuits, and/or the readout circuits. This synchronization is described in greater detail below with reference to FIGS. 7-8B.

In some embodiments, the image sensor 530 can include a first multiplexer 565, a second multiplexer 566, and/or a third multiplexer 567. As shown, the first multiplexer 565, the second multiplexer 566, and the third multiplexer 567 can be controlled using a deblur enable signal deblurEN. When the deblur enable signal deblurEN is un-asserted (e.g., is in a low or '0' state), the first multiplexer 565 and the third multiplexer 567 can stream CIS data (e.g., raw intensity image frames, blurry intensity image frames) to an image signal processor 552 of the image sensor 530, such as in lieu of streaming the raw CIS data to a deblur circuit 570 of the image sensor 530. In turn, the image signal processor 552 can provide the CIS data to a synchronous communications interface 555*a* (e.g., a MIPI interface/transmitter), such as for output from the image sensor 530.

Additionally, or alternatively, when the deblur enable signal deblurEN is un-asserted (e.g., is in a low or '0' state), the second multiplexer 566 can stream EVS data to the column-scan readout circuitry 553, such as in lieu of streaming the EVS data to the deblur circuit 570. In turn, the column-scan readout circuitry 553 can provide the EVS data to an event signal processor 554 of the image sensor 530, and the event signal processor 554 can provide the EVS data to a synchronous communications interface 555*b* (e.g., a MIPI interface/transmitter), such as for output from the image sensor 530.

In the illustrated embodiment, the synchronous communications interface 555*a* and the synchronous communications interface 555*b* can be independent physical interfaces. Alternatively, the synchronous communications interface 555*a* and the synchronous communications interface 555*b* can be merged. For example, CIS data and EVS data can be output from the image sensor 530 via a shared synchronous communications interface 555 (e.g., a shared MIPI interface, a shared virtual channel, embedded line).

Referring again to the first multiplexer 565, the second multiplexer 566, and the third multiplexer 567, when the deblur enable signal deblurEN is asserted (e.g., is in a high or '1' state), the first multiplexer 565 is enabled to stream CIS information read from CIS pixels of the pixel array 538 into the deblur circuit 570, and the second multiplexer 566 is enabled to stream EVS information read from EVS pixels of the event driven sensing array 542 into the deblur circuit 570. For example, when the deblur enable signal deblurEN is asserted, EVS information read from EVS pixels of the driven sensing array 542 can be constantly streamed into the deblur circuit 570 via the second multiplexer 566 (e.g., while CIS pixels of the pixel array 538 integrate photogenerated charge over an exposure period). Additionally, or alternatively, when CIS information is read out from CIS pixels of the pixel array 538 after the exposure period, digitized CIS information can be streamed into the deblur circuit 570 via the first multiplexer 565.

In turn, the deblur circuit 570 (*a*) can compute a fused image/video stream from the CIS data and the EVS data received via the first multiplexer 565 and the second multiplexer 566, respectively, and (b) can output the fused image/video stream into the third multiplexer 567 for streaming to the image signal processor 552. The fused image/video stream may then be provided from the image signal processor 552 to the synchronous communications interface 555*a* for output from the image sensor 530. The fusion computations performed by the deblur circuit 570 can be targeted at deblurring the CIS frame information captured by CIS pixels of the pixel array 538, correcting for rolling shutter artifacts, and/or creating interpolated video frames. On-chip deblurring of CIS frame information is discussed in greater detail below with reference to FIGS. 6-10.

In embodiments in which the image sensor 530 is a stacked system, components of the deblur circuit 570 can be positioned on one or more of the dies (e.g., a top die, a middle die, or a bottom die) of the stacked system. As a specific example, the image sensor 530 can be generally similar to the stacked system 430 of FIGS. 4A and 4B described above, and the deblur circuit 570 of the image sensor 530 can be positioned on a third (or bottom) die of the image sensor 530.

In some embodiments, the first multiplexer 565, the second multiplexer 566, and/or the third multiplexer 567 shown in FIG. 5 can be omitted. In at least some of these embodiments, the image sensor 530 can be operated in a manner generally similar to how the image sensor 530 illustrated in FIG. 5 would operate if the deblur enable signal deblurEN was perpetually in the asserted state (e.g., by always streaming CIS information and EVS information into the deblur circuit 570 for the deblur circuit 570 to compute a fused image/video stream). Additionally, or alternatively, the image sensor 530 can be configured to output the raw CIS data and/or the EVS data. For example, the image sensor 530 can output the raw CIS data and/or the EVS data in addition to or in lieu of outputting a fused image/video steam based on the raw CIS data and the EVS data. Furthermore, although the image signal processor 552 of the image sensor 530 illustrated in FIG. 5 is configured to process the fused image/video stream output by the deblur circuit 570 when the deblur enable signal deblurEN is asserted, the image signal processor 552 in other embodiments can be configured to process CIS information read out from CIS pixels of the pixel array 538 prior to the deblur circuit 570 computing a fused image/video stream. In such embodiments, after processing the CIS information read out from CIS pixels of the pixel array 538, the image signal processor 552 can output the processed CIS information to the deblur circuit 570 for the deblur circuit 570 to compute a fused image/video stream based on the processed CIS information (e.g., as opposed to based on the raw CIS information).

Figure 6:
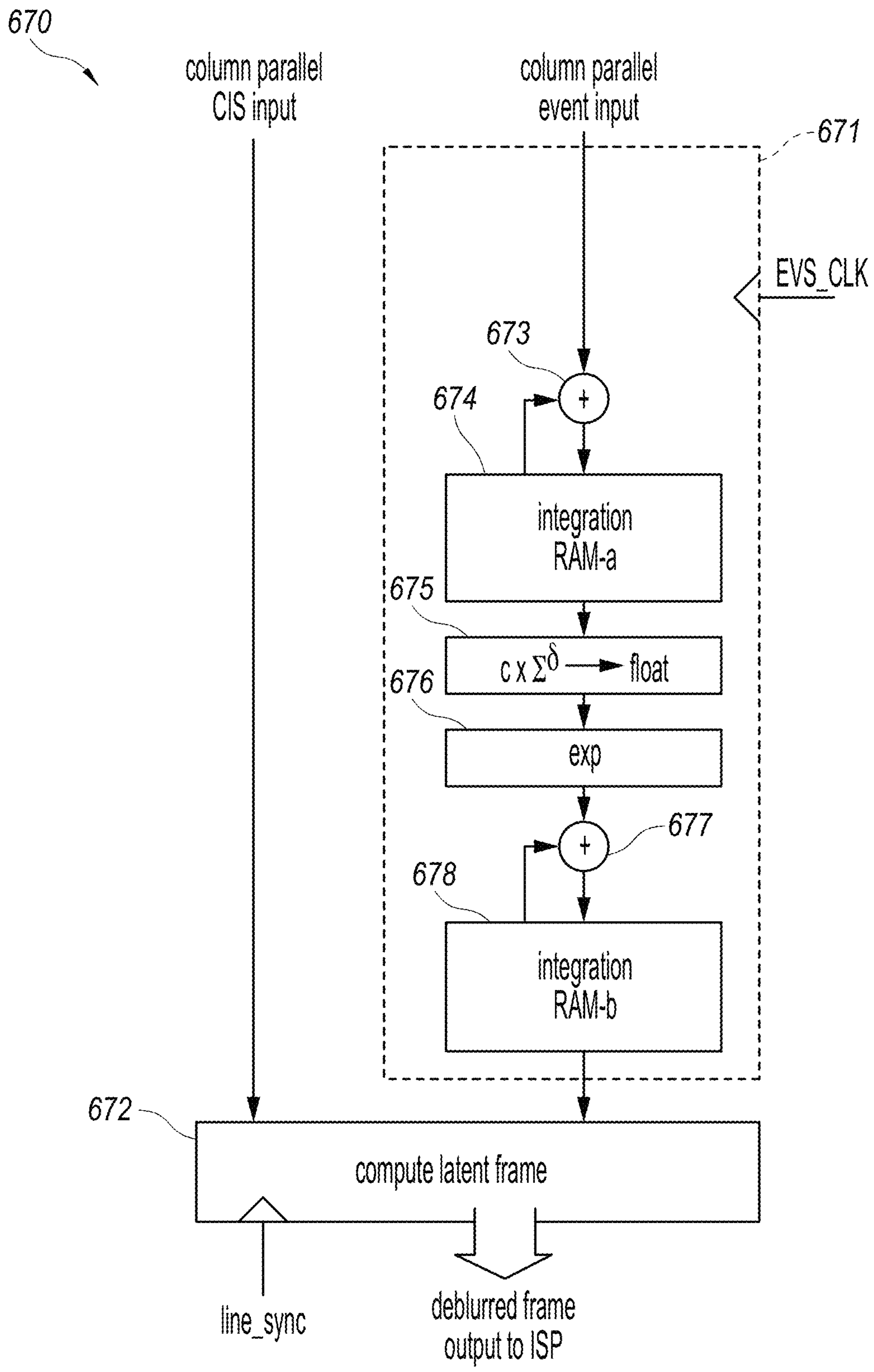
FIG. 6 is a partially schematic diagram of a deblur circuit configured in accordance with various embodiments of the present technology.

FIG. 6 is a partially schematic diagram of a deblur circuit 670 configured in accordance with various embodiments of the present technology. The deblur circuit 670 can be an example of the deblur circuit 570 of FIG. 5, or of other deblur circuits configured in accordance with the present technology. As discussed in greater detail below, the deblur circuit 670 can implement event-guided deblur of CIS data, such as on-chip (e.g., on the image sensor 530 of FIG. 5), and thereafter output a deblurred image frame to a downstream image signal processor.

As shown, the deblur circuit 670 includes an event-based double integral (EDI) computation block 671 and a latent frame computation block 672. Operation of at least a portion of the EDI computation block 671 can be clocked by a control signal EVS_CLK that at least generally follows the time continuous signal e(t) of Equation 13 above, an example of which is shown in plot 212 of FIG. 2. In other words, operation of at least a portion of the EDI computation block 671 can be enabled whenever an event is triggered and read out from an EVS pixel. Operation of the latent frame computation block 672 can be clocked by a control signal line_sync. The control signal line-sync can be provided/controlled by a common control block of an image sensor corresponding to the deblur circuit 670, such as the common control block 568 of the image sensor 530 of FIG. 5. In some embodiments, the control signal line_sync can correspond to the duration of the exposure period T, as shown in Equations 16 and 17 above.

In the illustrated embodiment, the EDI computation block 671 includes a plurality of EDI components. More specifically, the EDI computation block 671 includes a counter 673, a first integration buffer 674, a product computation block 675, an exponential computation block 676, an integration computation block 677, and a second integration buffer 678. The counter 673 can be an integer counter (e.g., an up/down counter) or another suitable type of counter for computing a running sum of events detected by each EVS pixel during an exposure period, and the first integration buffer 674 can be configured to track/store the running sums for the exposure period.

The counter 673 and the first integration buffer 674 can be configured to compute the first, inner integral of the EDI model described above. For example, as event data is streamed into the deblur circuit 670 during the exposure period, the counter 673 can be enabled via the control signal EVS_CLK whenever an event is detected, which can cause the counter 673 to increment or decrement (depending on the polarity of the detected event) a running sum maintained by the first integration buffer 674 for the EVS pixel that detected the event. The running sum for each of the EVS pixels over time is equivalent to E (t) shown in Equation 14 above, an example of which is shown in plot 214 of FIG. 2. The buffer size of the first integration buffer 674 can be relatively small for such an implementation. As a specific example, assuming the duration of an exposure period between time $t_s$ and time $t_{s+T}$ is 33 ms, the first integration buffer 674 can include a buffer size of 10 bits/pixel. In some embodiments, a floating point calculator can be used in lieu of the counter 673. In such embodiments, the first integration buffer 674 may have a larger or smaller buffer size.

The product computation block 675, the exponential computation block 676, the integration computation block 677, and the second integration buffer 678 can be configured to compute the second, outer integral of the EDI model described above. For example, the product computation block 675 can multiply the running sums stored in the first integration buffer 674 by the contrast threshold parameter c, which is equivalent to $C_{log\text{-}TH}$ (described above with reference to Equations 6-12 and 15-17) and is assumed to remain constant. Thus, for each EVS pixel, the output of the product computation block 675 can be equivalent to c $\Sigma_{i\in[s,t]}p_i$. Thereafter, for each EVS pixel, the exponential computation block 676 can determine the exponential of the output of the product computation block 675, resulting in exp (c $\Sigma_{i\in[s,t]}$ $p_i$). The integration computation block 677 can, for each EVS pixel, continuously integrate the output of the exponential computation block 676 over time. More specifically, the integration computation block 677 can integrate each of the outputs of the exponential computation block 676 from time $t_s$ (corresponding to the start of the current exposure period) to time t, ending at time $t_{s+T}$ (corresponding to the end of the current exposure period). The second integration buffer 678 can track/store the results of this time continuous integration, which are each equivalent to $$\int_s^{s+T}$$

exp (c $\Sigma_{i \in [s,t]} p_i$) dt at the end of the exposure period. Example results for an EVS pixel output by the integration computation block 677 are shown in the plot 216 of FIG. 2.

Each of the computations performed by the product computation block 675, the exponential computation block 676, the integration computation block 677, and the second integration buffer 678 can be performed in floating point representation, such as 9-bit mantissa and 4-bit exponent. In addition, although operation of the counter 673 and/or the first integration buffer 674 can be clocked by the control signal EVS_CLK, the product computation block 675, the exponential computation block 676, the integration computation block 677, and/or the second integration buffer 678 can be enabled to continuously perform their respective operations over time. As a specific example, in some embodiments, operation of the integration computation block 677 is not clocked by the control signal EVS_CLK nor triggered by events. Rather, the integration computation block 677 is configured to continuously integrate the outputs of the exponential computation block 676 over time, at least between time $t_s$ and time $t_{s+T}$ corresponding to the start and stop times, respectively, of a corresponding exposure period/EVS accumulation period. In these embodiments, operation of the product computation block 675 and/or the exponential computation block 676 can be clocked by the control signal EVS_CLK or enabled to continuously perform their respective operations over time.

Furthermore, because events detected at each EVS pixel are accumulated by the EDI computation block 671, raw EVS data input into the EDI computation block 671 of the deblur circuit 670 can be discarded once events of the raw EVS data have been accumulated by the EDI computation block 671. As a result, the second integration buffer 678 need only store/maintain the accumulated results of the integration computation block 677, meaning that the second integration buffer 678 can have a relatively small buffer size (e.g., ~9 MB, such as about 8.625 MB or about 13 bits/pixel) in comparison to buffers utilized in off-chip, event-guided deblur solutions. In addition, because the raw EVS data can be discarded rather than output from an image sensor corresponding to the deblur circuit 670, IO throughput and power consumption can be reduced in comparison to off-chip, event-guided deblur solutions in which the raw EVS data is output from the image sensor to an external application processor. In other embodiments of the present technology, all or a subset of the raw EVS data can be stored and/or output from the image sensor after events in the raw EVS data are accumulated.

After the exposure period ends, CIS data can be read out from CIS pixels of the image sensor and streamed into the latent frame computation block 672 of the deblur circuit 670. At this point, the latent frame computation block 672 can deblur the CIS data by combining/fusing the CIS data with the accumulated EVS data stored in the second integration buffer 678 of the EDI computation block 671. More specifically, the latent frame computation block 672 can compute a latent image frame L(s) corresponding to time $t_s$ (the start of the exposure period) by performing the operation specified in Equation 17 above for each EVS pixel. Additionally, or alternatively, the latent frame computation block 672 can compute one or more latent image frames L(t) corresponding to one or more times t between time $t_s$ and time $t_{s+T}$ (the end of the exposure period) by performing the operation specified in Equation 15 above for each EVS pixel. The final, deblurred image data (e.g., the latent image frame L(s) and/or one or more of the latent image frames L(t)) can be output from the latent frame computation block 672 to an image signal processor of a corresponding imaging system. Because the CIS data can be read directly into the latent frame computation block 672 after the exposure period and because the accumulated EVS data from the second integration buffer 678 is readily available and already aligned at this time (as discussed in greater detail below), no CIS frame buffer is required to perform on-chip deblur using the deblur circuit 670. Therefore, the deblur circuit 670 and/or the corresponding image sensor can lack a CIS frame buffer in some embodiments. In other embodiments, the deblur circuit 670 and/or the corresponding image sensor can include a CIS frame buffer, such as in embodiments in which raw CIS data can be output in addition to fused image/video data.

Figure 7:
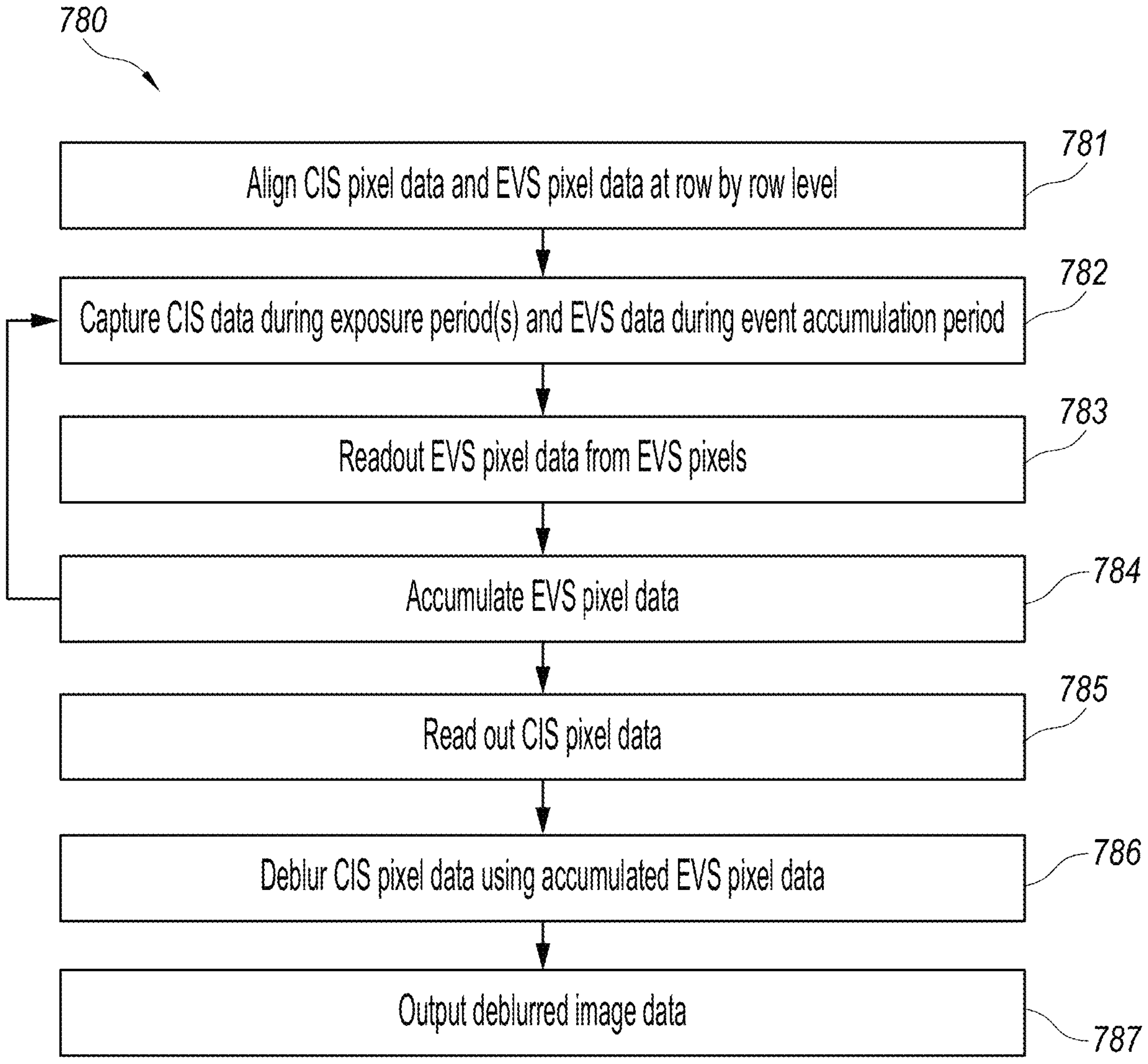
FIG. 7 is a flow diagram illustrating a method of operating an image sensor in accordance with various embodiments of the present technology.

FIG. 7 is a flow diagram illustrating a method 780 of operating an image sensor in accordance with various embodiments of the present technology. For example, the method 780 can be a method of performing on-chip deblurring of CIS data. The method 780 is illustrated as a series of blocks 781-787 or steps. All or a subset of one or more of the blocks 781-787 can be executed by devices or components of an image sensor configured in accordance with various embodiments of the present technology. For example, all or a subset of one or more of the blocks 781-787 can be performed by a hybrid image sensor, CIS pixels of a pixel array, EVS pixels of an event driven sensing array, a common control block, row/column control circuitry, column readout circuitry, column-scan readout circuitry, and/or a deblur block or circuit. All or a subset of one or more of the blocks 781-787 of the method 780 can be executed in accordance with the description of FIGS. 1-6 above and/or with the description below. Indeed, several of the blocks 781-787 of the method 780 are described below with reference to FIGS. 8A-9B.

The method 780 begins at block 781 by aligning CIS pixel data with corresponding EVS pixel data. In some embodiments, aligning CIS pixel data with corresponding EVS pixel data can be performed at least in part using a common control block of a corresponding image sensor. For example, the common control block can synchronize operations of row/column control circuitry and/or a deblur block of the image sensor, such as by using one or more control signals.

Aligning the CIS pixel data with the corresponding EVS pixel data at block 781 can include aligning/synchronizing the timings of exposure period(s) of one or more rows of CIS pixels with event accumulation period(s) of one or more corresponding EVS pixels. In some embodiments, aligning the exposure periods(s) with an event accumulation period can include aligning the exposure period(s) with one another and/or with the event accumulation period such that the exposure period(s) and the event accumulation period have a same start time $t_s$ and/or a same end time $t_{s+T}$. For example, prior to the start of the exposure period(s) and the event accumulation period, CIS pixels of one or more CIS pixel rows can be reset at a same time as (a) one another and/or (b) one or more EVS pixels of one or more EVS pixel rows that correspond to the one or more CIS pixel rows. As a result, the exposure period(s) for the CIS pixels and the event accumulation period for the EVS pixel(s) can start at the same time as one another. In addition, assuming that the exposure period(s) and the event accumulation period have a same duration, aligning the start times of the exposure period(s) and the event accumulation period with one another can also align their stop times.

Furthermore, as discussed above with reference to FIG. 6, a deblur circuit of an image sensor of the present technology can be configured to (a) integrate events to compute a running summation of events detected by an EVS pixel, (b) store the running summation in a first integration buffer, (c) integrate the exponential of the product of (i) the running summation and (ii) a contrast threshold parameter, and (d) store the results of the integration of the exponential in a second integration buffer. Therefore, to ensure that the running summation stored in the first integration buffer of the deblur circuit and the results of the integration of the exponential stored in the second integration buffer correspond to only events detected by the EVS pixel during the corresponding event accumulation period (which, as discussed above, can be aligned with exposure period(s) of corresponding CIS pixels), the first integration buffer and/or the second integration buffer can be reset before the aligned start time of the event accumulation period and the exposure period(s). In some embodiments, the first integration buffer and/or the second integration buffer can be reset at a same time as the EVS pixels and/or the corresponding CIS pixels.

Figure 8A:
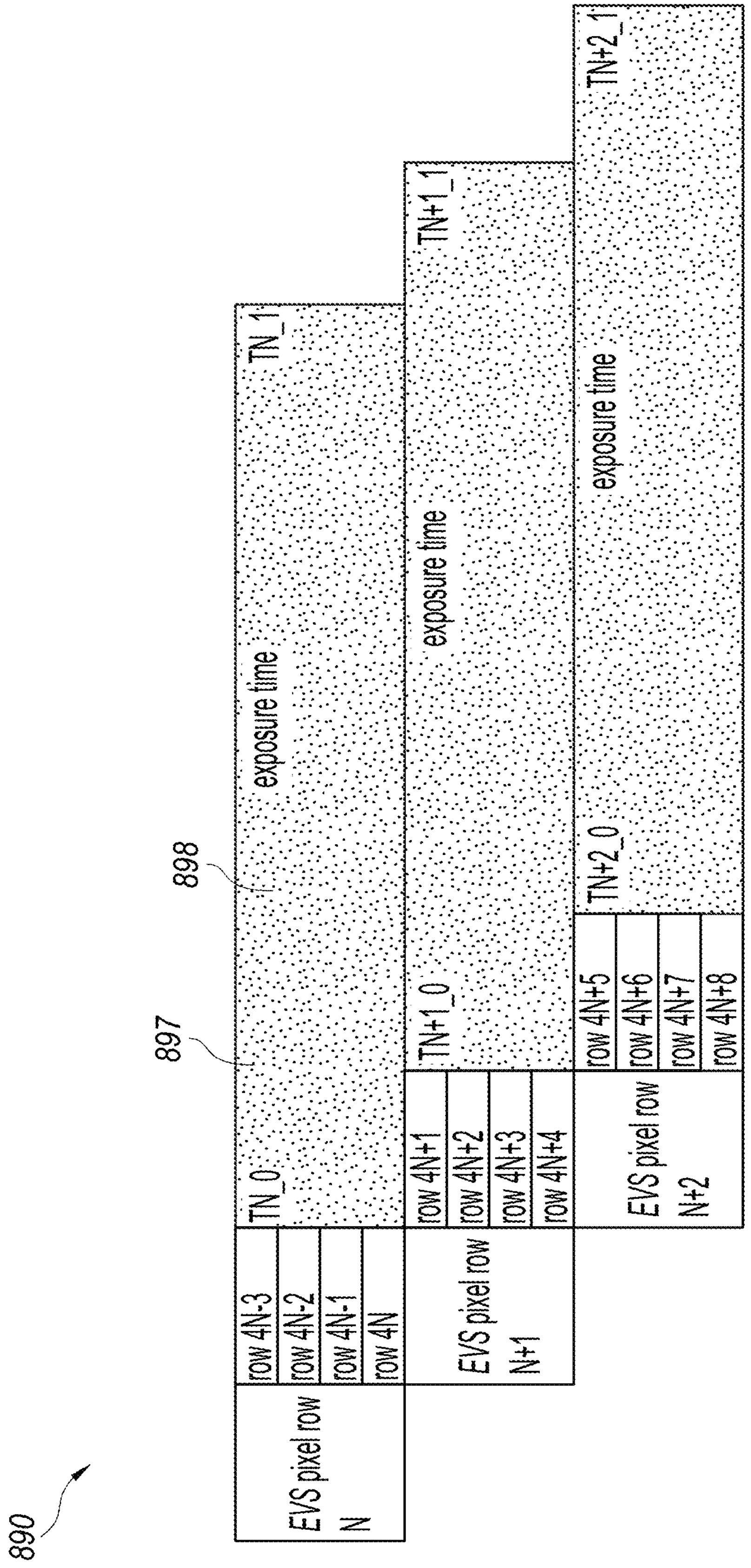
FIGS. 8A and 8B are timing diagrams corresponding to methods of operating an image sensor and/or a corresponding imaging system in accordance with various embodiments of the present technology.
Figure 8B:
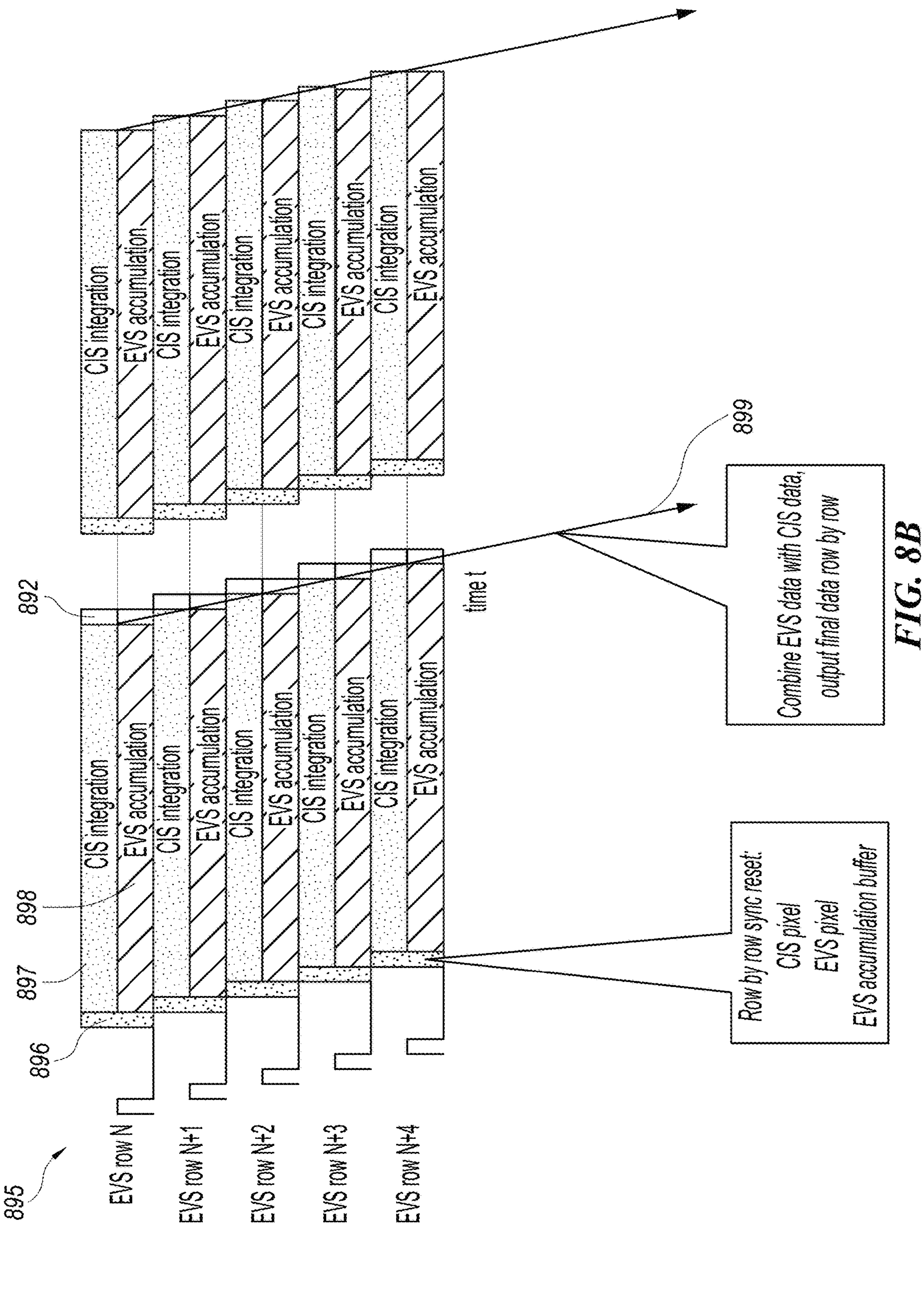

For the sake of clarity and understanding of the alignment conducted at block 781 of the method 780, consider FIGS. 8A and 8B that illustrate timing diagrams 890 and 895, respectively, in accordance with various embodiments of the present technology. Referring to FIG. 8A, the timing diagram 890 illustrates three EVS pixel rows (EVS pixel rows N, N+1, and N+2) and twelve CIS pixel rows (CIS pixel rows 4N−3 to 4N+8). In the illustrated embodiment, each of the EVS pixel rows N, N+1, and N+2 corresponds to four of the twelve CIS pixel rows shown. For example, EVS pixel row N corresponds to CIS pixel rows 4N, 4N−1, 4N−2, and 4N−3. In other words, EVS data captured by EVS pixel(s) of EVS pixel row N can be used for event-guided deblur of CIS data captured by CIS pixels of CIS pixel rows 4N, 4N−1, 4N−2, and 4N−3.

CIS data captured by CIS pixels of the CIS pixel rows 4N, 4N−1, 4N−2, and 4N−3 is frame-based and is synchronously read out after each corresponding exposure period ends. In many active pixel sensors, CIS data is read out row-by-row. In such configurations, different exposure period start and stop times are often used for the different rows. For example, in many active pixel sensors, CIS pixels of CIS pixel row 4N often will have a first exposure period that starts and stops at different times from a second exposure period used for CIS pixels of CIS pixel row 4N−1. This can be problematic for event-guided deblur when the CIS pixel row 4N and the CIS pixel row 4N−1 correspond to a same EVS pixel row because the misalignment between the first exposure period and the second exposure period means that the start and/or stop times for an event accumulation period used for the corresponding EVS pixel row will be different from the start and/or stop times of the first exposure period and/or the second exposure period. As a result, EVS data captured by an EVS pixel of the EVS pixel row will be misaligned from CIS data captured by CIS pixels of CIS pixel row 4N and/or CIS pixel row 4N−1. Such misalignment can affect the accuracy and/or efficacy of event-guided deblur operations performed on the CIS data and/or may require additional memory/processing to align the CIS data with the EVS data post data capture and/or readout.

To address this concern, at block 781 of the method 780, the exposure periods of CIS pixels rows corresponding to a same EVS pixel row can be aligned with one another and with an event accumulation period of the EVS pixel row. For example, as shown in FIG. 8A, the CIS pixel rows 4N, 4N−1, 4N−2, and 4N−3 all correspond to EVS pixel row N. Thus, at block 781, the exposure periods 897 for CIS pixel rows 4N, 4N−1, 4N−2, and 4N−3 can be aligned with one another and with an event accumulation period 898 of the EVS pixel row N. As a result, the exposure periods 897 and the event accumulation period 898 can each start at time TN_0. In addition, because the durations of the exposure periods 897 and the event accumulation period 898 are the same, alignment of the start times at time TN_0 can align the ends times of the exposure periods 897 and the event accumulation period 898 at time TN_1. In this manner, EVS data captured by EVS pixels of the EVS pixel row N is aligned with CIS data captured by CIS pixels of CIS pixel rows 4N, 4N−1, 4N−2, and 4N−3. The alignment between (i) the exposure/integration periods 897 for CIS pixel rows and (ii) the event/EVS accumulation period 898 for the EVS row N is further shown in the timing diagram 895 of FIG. 8B.

Continuing with the above example, alignment between the exposure periods 897 and the event accumulation period 898 can be achieved by resetting the EVS pixels of the EVS pixel row N and the CIS pixels of the CIS pixel rows 4N, 4N−1, 4N−2, and 4N−3 at a same time and/or before the start time TN_0. For example, referring to FIG. 8B, the EVS pixels of the EVS pixel row N and the CIS pixels of the CIS pixel rows 4N, 4N−1, 4N−2, and 4N−3 can each be reset in a time period 896 preceding the start time TN_0 of the exposure periods 897 and the event accumulation period 898.

In addition, to ensure that deblur computations performed by a deblur circuit of a corresponding image sensor correspond to only the exposure periods 897 of the CIS pixel rows 4N, 4N−1, 4N−2, and 4N−3 and the event accumulation period 898 of the EVS pixel row N, a first integration buffer and/or a second integration buffer of the deblur circuit can be reset before the start time TN_0, such as (i) within the time period 896 of FIG. 8B and/or (ii) at a same time as the EVS pixels of the EVS pixel row N and the CIS pixels of the CIS pixel rows 4N, 4N−1, 4N−2, and 4N−3. The other EVS pixels rows (e.g., the EVS pixel rows N+1, N+2, N+3, N+4, etc.) and the other CIS pixel rows (e.g., 4N+1, 4N+2, . . . , 4N+8, etc.) can be operated in a similar manner.

Referring again to FIG. 7, the method 780 can continue by at block 782 by (a) capturing CIS data using CIS pixels during corresponding exposure periods and (b) capturing EVS data (also referred to herein as "EVS pixel data" or as "event data") using EVS pixels. Referring again to FIG. 8B for the sake of example, CIS pixels of CIS pixel rows that correspond to EVS pixel row N can integrate photogenerated charge in the CIS pixels during the exposure period 897 that extends from start time TN_0 to stop time TN_1. Simultaneously, the EVS pixel(s) of the EVS pixel row N can asynchronously detect events during the aligned EVS accumulation period 898 that also extends from start time TN_0 to stop time TN_1.

In some embodiments, EVS pixels can be selectively enabled to capture EVS data (e.g., selectively enabled to detect events) during a corresponding event accumulation period. For example, referring to FIG. 8B, an EVS pixel of EVS pixel row N can be enabled at (or shortly before) the start time TN_0 of the event accumulation period 898 such that the EVS pixel is configured to detect events that occur during the event accumulation period 898 between time TN_0 and time TN_1. Additionally, or alternatively, the EVS pixel of the EVS pixel row N can be disabled at (or shortly after) the stop time TN_1 of the event accumulation period 898 and/or at other times outside of corresponding event accumulation periods. Selectively disabling the EVS pixel at (or shortly after) the stop time TN_1 of the event accumulation period 898 and/or at other times outside of corresponding event accumulation periods for that EVS pixel can save power.

In other embodiments, EVS pixels can remain enabled to capture EVS data at times outside of corresponding event accumulation periods. For example, EVS pixels of EVS pixel row N in FIG. 8B can remain activated and enabled to detect events that occur after the time TN_1 corresponding to the end of the event accumulation period, such as events that occur within a time period 892 shown in FIG. 8B. Such events detected by the EVS pixels of the EVS pixel row N after the time TN_1 can either be (a) discarded without being accumulated by a deblur circuit of a corresponding image sensor or (b) used in other operations (e.g., video frame interpolation) of the image sensor.

At block 783, the method 780 continues by reading out events detected by the EVS pixels of the event driven sensing array. Block 783 can be performed while performing block 782. For example, when an EVS pixel detects an event, the event can be read out from the EVS pixel. When an event detected by an EVS pixel is read out from the EVS pixel, the EVS pixel can be reset and thereby enabled to detect subsequent events.

A single EVS pixel may detect hundreds of events over a single event accumulation period. In some embodiments, each of these events can be read out of the EVS pixel and/or provided to a deblur circuit of the corresponding image sensor for accumulation. Therefore, for a single CIS frame, a relatively large amount of EVS data can be provided to the deblur circuit for accumulation and subsequent use in event-guided deblur of CIS data corresponding to the CIS frame.

Such a large amount of EVS data can, in some cases, complicate and/or slow down deblur computations performed by the deblur circuit of the corresponding image sensor, which may not be appropriate or acceptable for certain applications. Therefore, in some embodiments, EVS data can be readout of EVS pixels using a row-by-row scan readout. More specifically, the image sensor can scan/step through the event driven sensing array row-by-row and spend a uniform amount of time reading out each EVS pixel row. In this manner, the scan readout can limit a number of EVS readouts per CIS frame, which can simplify and/or speed up deblur computations performed by the deblur circuit.

Figure 9A:
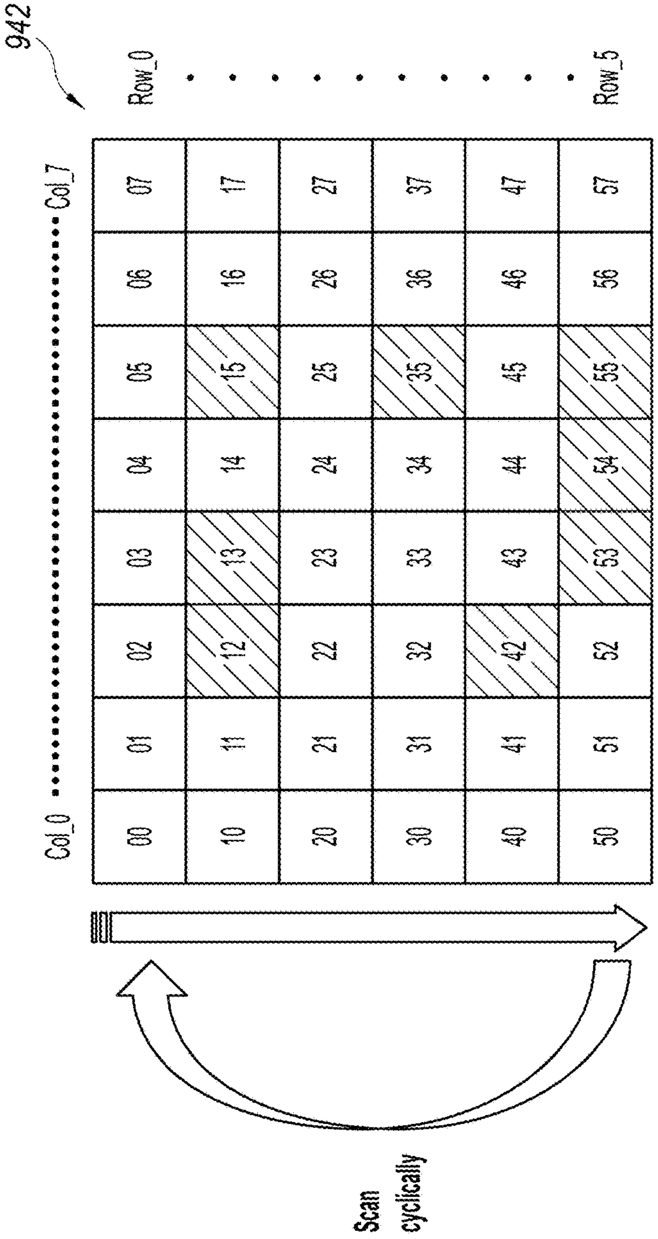
FIG. 9A is a partially schematic diagram illustrating an event driven sensing array and a row scan readout scheme configured in accordance with various embodiments of the present technology.
Figure 9B:
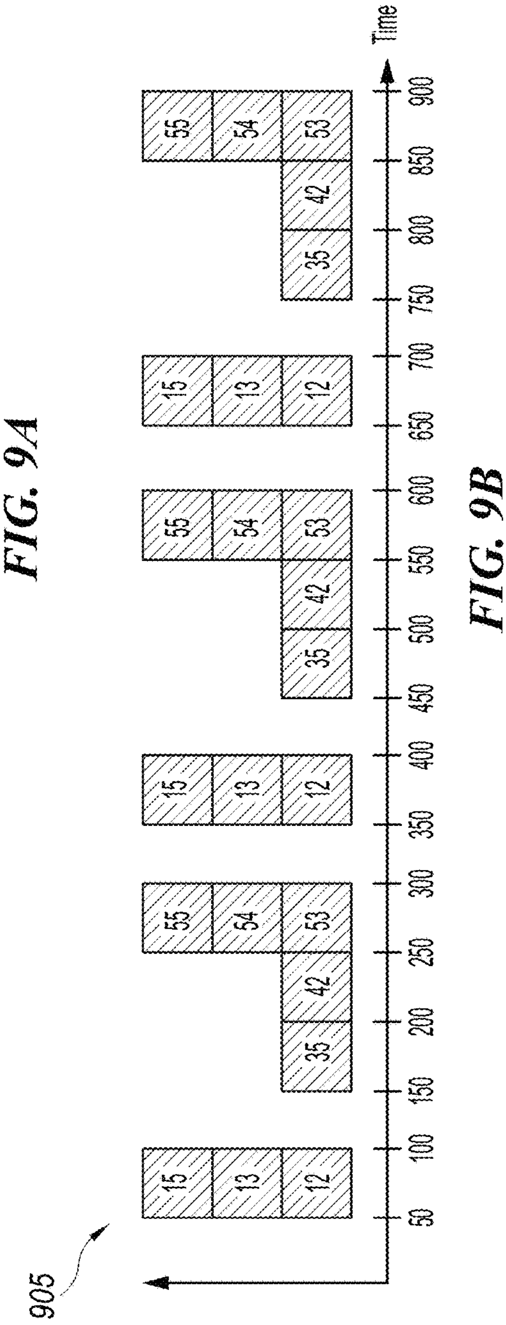
FIG. 9B is a plot of detected events readout from the event driven sensing array of FIG. 9A using the row scan readout scheme of FIG. 9A in accordance with various embodiments of the present technology.

For the sake of clarity and example, consider FIGS. 9A and 9B that illustrate (i) an example event driven sensing array 942 and (ii) a corresponding plot 905 of detected events readout from the event driven sensing array 942 for a single CIS frame, respectively. As shown in FIG. 9A, the event driven sensing array 942 includes a plurality of EVS pixels 00-57 arranged in a plurality of rows Row_0-Row_5 and a plurality of columns Col_0-Col_7. EVS pixels 12, 13, 35, 42, 53, 54, and 55 in the sensing array 942 have detected events.

To read out EVS data captured by the EVS pixels 00-57 of the event driven sensing array 942, the image sensor can scan cyclically, row-by-row, through the rows Row_0-Row_5 of the event driven sensing array 942, spending a same amount of time at each row to read out events from EVS pixels of that row. For example, although none of the EVS pixels 00-07 of the row Row_0 have detected events, the image sensor can spend a fixed/preset amount of time (e.g., 50 ns) at Row_0 before moving on the row Row_1. Then, at row Row_1, the image sensor can spend the same fixed amount of time (e.g., 50 ns) reading out events detected by the EVS pixels 10-17. In the illustrated example, EVS pixels 12, 13, and 15 in row Row_1 have detected events. Therefore, during the fixed/preset amount of time allocated for row Row_1, the image sensor can (i) read out the events detected by EVS pixels 12, 13, and 15, and/or (ii) reset EVS pixels 12, 13, and 15 such that they are enabled to detect subsequent events. At the end of the fixed/preset amount of time allocated for row Row_1, the image sensor can move on to row Row_2 of the event driven sensing array 942 to read out events (if any) detected by EVS pixels 20-27 of row Row_2. The plot 905 of FIG. 9B illustrates the results of the scan readout performed on the event driven sensing array 942 of FIG. 9A.

The row-by-row scan readout scheme described above therefore limits the total number of EVS readouts per CIS frame and keeps the time required to scan every row in the event driven sensing array constant through each scan cycle. For example, given (i) an event driven sensing array having 2,000 rows of EVS pixels and (ii) a 50 ns preset amount of time to read out each row of EVS pixels in the event driven sensing array, the scan readout can take 100 μs (2,000 EVS pixel rows×50 ns) to scan one time through the entire event driven sensing array. Thus, assuming a CIS exposure period is 32 ms in duration, the scan readout can limit the number of EVS readouts per EVS pixel to 320 (320 ms divided by 100 μs) for each CIS readout. Stated another way, each CIS frame readout can correspond to a maximum number of 320 EVS readouts per EVS pixel. This can limit the amount of EVS data fed to the deblur circuit, which can simplify computations performed by the deblur circuit and/or speed up availability of final results of such computations.

In the examples of the row-by-row scan readout described above, the image sensor spends a fixed/preset amount of time at each EVS pixel row reading out detected events (if any). As discussed above, this can keep the total time required to scan once through the entire event driven sensing array unchanged for each cycle of the scan readout. In other embodiments, the image sensor can skip EVS pixel rows in which no events have been detected. For example, referring again to FIG. 9A, none of the EVS pixels 20-27 of row Row_2 of the event driven sensing array 942 have detected events. Thus, during scan readout, the image sensor can spend a preset amount of time (e.g., 50 ns) reading out the events detected by EVS pixels 12, 13, and 15 of row Row_1, skip over row Row_2, and then spend the next preset amount of time (e.g., 50 ns) reading out the event detected by EVS pixel 35 of row Row_3. In such embodiments, the total time spent by the scan readout cycling through the entire event driven sensing array 942 can vary across cycles depending on which of the rows Row_0-Row_5 include EVS pixels that have detected events.

Referring again to FIG. 7, the method 780 can continue at block 784 by, for each EVS pixel of the event driven sensing array, accumulating EVS data read out from the EVS pixel during a corresponding event accumulation period. Block 784 can be performed while performing blocks 782 and/or 783, as is shown by the arrow returning from block 784 to block 782. Additionally, or alternatively, block 784 can be performed by an on-chip deblur circuit of the image sensor.

As discussed above, accumulating EVS data can include, for each EVS pixel, computing and maintaining a running sum of events, such as using a counter and a first integration buffer (e.g., of a deblur circuit of a hybrid image sensor). In addition, accumulating EVS data can include, for each EVS pixel, (a) computing a product of the running sum with a contrast threshold parameter, (b) determining the exponential of the product, and (c) integrating the exponential continuously over a corresponding EVS accumulation period. The results of the integration for each EVS pixel can be stored in a second integration buffer (e.g., of a deblur circuit of a hybrid image sensor).

As discussed above, for each EVS pixel, EVS data is accumulated over a corresponding event accumulation period. For example, for each EVS pixel, the first integration buffer and the corresponding portion of the second integration buffer can be reset prior to a start of an event accumulation period of the EVS pixel to reset (i) a running sum stored in the first integration buffer and (ii) integration results stored in the corresponding portion of the second integration buffer. Event accumulation can then be enabled at the start of the event accumulation period and thereafter disabled at the end of the event accumulation period such that integration results stored in the corresponding portion of the second integration buffer at the end of the event accumulation period correspond to only events detected by the corresponding EVS pixel during the event accumulation period. In some embodiments, once event data has been accumulated, the raw event data can be discarded.

Referring to FIG. 8B again for the sake of clarity and example, the first integration buffer(s) and the second integration buffer(s) corresponding to the EVS pixel(s) of EVS pixel row N can be reset during the time period 896 prior to the start TN_0 of the event accumulation period 898. At the start TN_0 of the event accumulation period 898, event accumulation in the deblur circuit can be enabled for the EVS pixel(s) of EVS row N. As events are detected by the EVS pixel(s) during the event accumulation period 898, the corresponding running count(s)/sum(s) maintained in the corresponding first integration buffer(s) is/are updated. In addition, the running sum(s) are multiplied by a contrast threshold, exponentials of the resulting products are computed, and the exponentials are integrated. The integration result(s) corresponding to the EVS pixel(s) of the EVS pixel row N are stored to the corresponding portion(s) of the second integration buffer.

At block 785, the method 780 continues by reading out CIS data at the end of the corresponding exposure period(s). In some embodiments, reading out the CIS data can include reading out the CIS data into the deblur circuit, such as into a latent frame computation block of the deblur circuit. In these and other embodiments, reading out the CIS data can include reading out the CIS data from CIS pixel in rows or groups of rows. For example, in embodiments in which multiple CIS pixel rows correspond to a same EVS pixel row, CIS data captured by CIS pixels of the multiple CIS pixel rows can be read out together/at the same time at or after the end of the corresponding exposure period. In some embodiments, reading out the CIS data can include skipping readout of one or more rows and/or columns of CIS pixels (e.g., to reduce resolution of the CIS data, to match a resolution of EVS data captured by EVS pixels of the event driven sensing array, and/or to reduce a mismatch between resolution of CIS data captured by CIS pixels and resolution of the EVS data captured by the EVS pixels of the event driven sensing array). In these and other embodiments, reading out the CIS data can include binning one or more rows and/or columns of CIS pixels (e.g., to reduce resolution of the CIS data, to match a resolution of EVS data captured by EVS pixels of the event driven sensing array, and/or to reduce a mismatch between resolution of CIS data captured by CIS pixels and resolution of the EVS data captured by the EVS pixels of the event driven sensing array). Additional details on (a) skipping readout of one or more rows and/or columns of CIS pixels and/or (b) binning one or more rows and/or columns of CIS pixels during readout, are provided in the application titled "METHODS FOR OPERATING HYBRID IMAGE SENSORS HAVING DIFFERENT CIS-TO-EVS RESOLUTIONS," which has been incorporated by reference herein in its entirety above.

Referring again to FIGS. 8A and 8B for the sake of clarity and example, CIS pixel rows 4N, 4N−1, 4N−2, and 4N−3 all correspond to the EVS pixel row N and, after alignment with an event accumulation period 898 for the EVS pixel(s) of the EVS pixel row N, have a common exposure period 897 that extends between time TN_0 and time TN_1. Thus, at or after the end time TN_1 of the exposure period 897, CIS data captured by CIS pixels of the CIS pixel rows 4N, 4N−1, 4N−2, and 4N−3 can be read out from the CIS pixels at the same time. Additionally, or alternatively, one or more of the CIS pixel rows 4N, 4N−1, 4N−2, and 4N−3 can be skipped or binned together during readout.

At block 786, the method 780 continues by deblurring the CIS data (read out from CIS pixels at block 785) using accumulated EVS data generated and stored in a corresponding portion of the second integration buffer at block 784. In some embodiments, deblurring the CIS data can include combining the CIS data with the accumulated EVS data to compute one or more latent image frames, such as (a) the latent image frame L(s) corresponding to the start time $t_s$ of the exposure period of the CIS pixels and/or (b) one or more other latent image frames L(t) corresponding to one or more other times t along the exposure period of the CIS pixels. In some embodiments, combining the CIS data with the accumulated EVS data can include interpolating the EVS data to generate additional EVS data corresponding to additional rows and/or columns of EVS pixels (e.g., to increase resolution of the EVS data, to match a resolution of CIS data captured by CIS pixels of the CIS pixel array, and/or to reduce a mismatch between resolution of CIS data captured by CIS pixels and resolution of the EVS data captured by the EVS pixels of the event driven sensing array). Additional details on interpolating EVS data corresponding to additional rows and/or columns of EVS pixels are provided (a) in the application titled "METHODS FOR OPERATING HYBRID IMAGE SENSORS HAVING DIFFERENT CIS-TO-EVS RESOLUTIONS," and (b) in the application entitled "HYBRID IMAGE SENSORS WITH VIDEO FRAME INTERPOLATION," each of which has been incorporated by reference herein in its entirety above.

At block 787, the method 780 continues by outputting deblurred image data from the image sensor. Outputting the deblurred image data can include outputting one or more latent image frames (e.g., the latent image frame L(s)) computed at block 786, such as in addition to or in lieu of outputting raw CIS data that is read out from the CIS pixels at block 785 and/or raw EVS data that is generated and read out from EVS pixels at block 783.

The timing diagram 895 of FIG. 8B provides a visual summary of the method 780 of FIG. 7. For example, the time period 896 of the timing diagram 895 corresponds to a period of time before exposure start time TN_0 in which EVS pixel(s) of EVS pixel row N, CIS pixels of CIS pixel rows corresponding to EVS pixel row N, the corresponding first integration buffer(s), and/or the corresponding portion(s) of the second integration buffer are reset. As a result of the reset, the CIS pixel rows have a common exposure period 897 that is aligned with an EVS accumulation period 898 for the EVS pixel row N. Therefore, while the CIS pixels of the CIS pixels rows capture CIS data during the exposure period 897, the EVS pixel(s) of the EVS pixel row detect events during the aligned EVS accumulation period 898. As events are detected and read into a deblur circuit of a corresponding image sensor (e.g., using a row-by-row scan readout scheme), the events are accumulated such that an integral of a running sum of the events over the entire EVS accumulation period 898 is available at the end of the exposure period 897. As shown by arrow 899 in FIG. 8B, at the end of the exposure period 897, CIS data can be read out from the CIS pixels of the CIS pixel rows corresponding to the EVS pixel row N and combined with the accumulated event data to compute final (deblurred) image data (e.g., one or more latent images), such as a latent image L(s), that can be output from the image sensor row-by-row.

Although the blocks 781-787 of the method 780 are described and illustrated in a particular order, the method 780 of FIG. 7 is not so limited. In other embodiments, all or a subset of one or more of the blocks 781-787 of the method 780 can be performed in a different order. In these and other embodiments, all or a subset of any of the blocks 781-787 can be performed before, during, and/or after all or a subset of any of the other blocks 781-787. Furthermore, a person skilled in the art will readily appreciate that the method 780 can be altered and still remain within these and other embodiments of the present technology. For example, all or a subset of one or more of the blocks 781-787 can be omitted and/or repeated in some embodiments.

As another example, the method 780 can include additional blocks in other embodiments of the present technology. As a specific example, the method 780 can include a decision block at which the method 780 determines whether a deblur enable signal deblurEN is asserted. In the event the method 780 determines the deblur enable signal deblurEN is asserted, the method 780 can proceed in a manner generally consistent with the discussion of blocks 781-787 described above. On the other hand, in the event the method 780 determines the deblur enable signal deblurEN is not asserted, the method 780 read out CIS data from CIS pixels and EVS data from EVS pixel into an image signal processor and an event signals processor, respectively, (e.g., for output from the image sensor via a synchronous communications interface), such as in lieu of reading the CIS data and the EVS data into the deblur circuit for the deblur circuit to compute deblurred image data.

Figure 10:
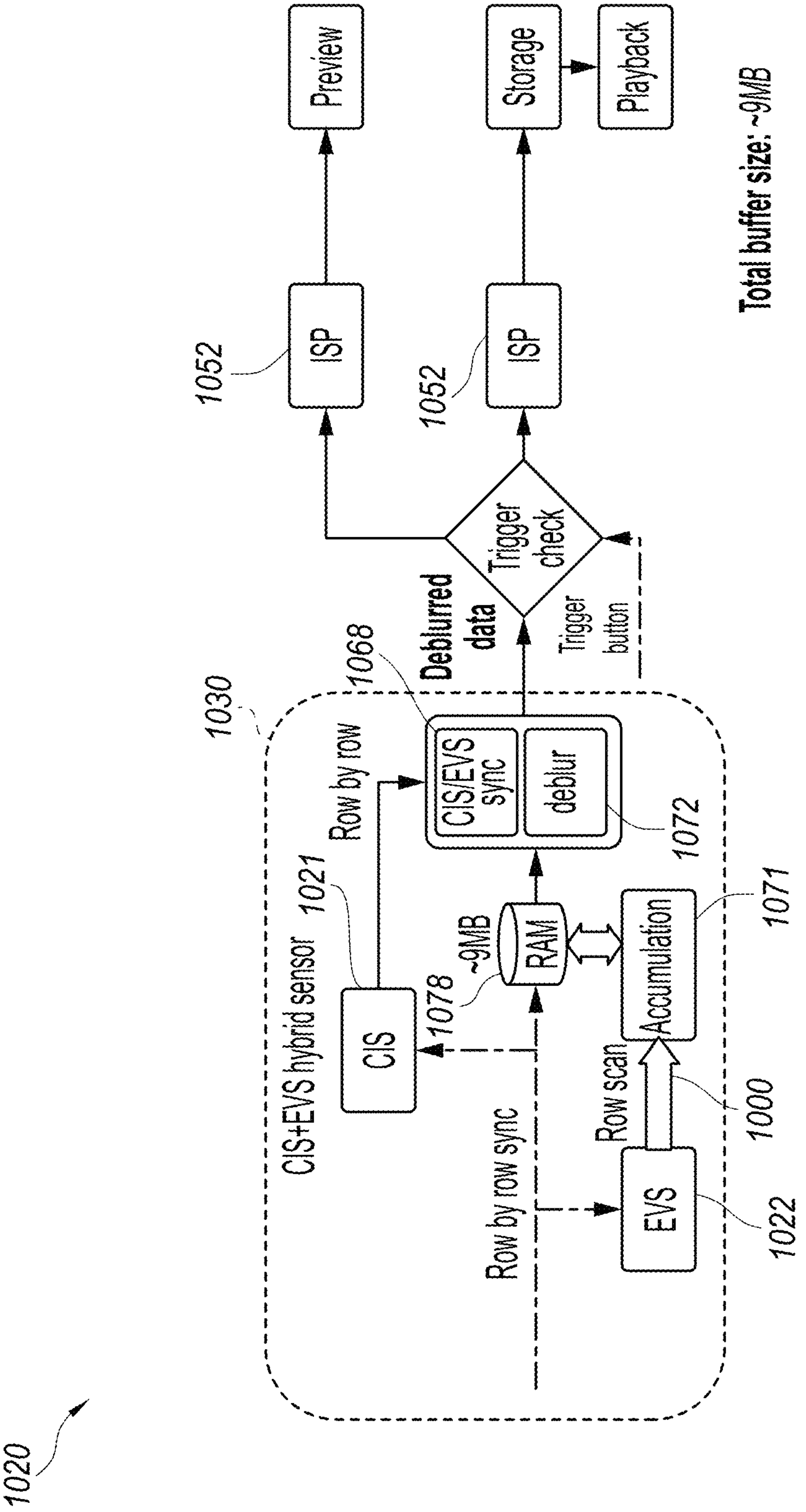
FIG. 10 is a partially schematic diagram illustrating an imaging system configured in accordance with various embodiments of the present technology.

FIG. 10 is a partially schematic diagram illustrating an imaging system 1020 configured in accordance with various embodiments of the present technology. As shown, the imaging system 1020 includes an image sensor 1030 with on-chip, event-guided deblur capabilities. More specifically, CIS data 1021 and EVS data 1022 can be aligned/sync, such as using a common control block 1068. Thereafter, while CIS pixels capture the CIS data 1021, EVS data 1022 can be read out from EVS pixels using a row scan readout scheme 1000 and accumulated by an EDI computation block 1071 to generate accumulated event data. The accumulated event data can be stored in a second integration buffer 1078. The CIS data 1021 can then be read out from the CIS pixels row-by-row or in groups of rows at the end of corresponding exposure periods, streamed into a latent frame computation block 1072, and deblurred using the accumulated event data stored in the second integration buffer. Deblurred image data can then be output from the image sensor 1030, such as to one or more downstream components of the imaging system 1020.

In comparison to the imaging system 320 of FIG. 3 that performs image deblur off-chip, the imaging system 1020 of FIG. 10 offers several advantages. For example, instead of ~550 MB of buffer space, the imaging system 1020 can use roughly 9 MB of buffer space to perform image deblur. In addition, the CIS data 1021 and the EVS data 1022 need not be output from the image sensor 1030 of the imaging system 1020. Rather, the imaging system 1020 can output deblurred image data, representing a large reduction in required IO bandwidth/throughput and (as a result) power consumption in comparison to the imaging system 320. Moreover, because the imaging system 1020 can perform deblur computations on the image sensor 1030, many of the delays present in the imaging system 320 can be reduced/eliminated in the imaging system 1020, meaning that the imaging system 1020 can support real-time video in addition to processing of still images. Furthermore, because the imaging system 1020 outputs deblurred image data, the interface between the image sensor 1030 and downstream components of the imaging system 1020 is relatively simple and easy to work with, especially in comparison to the interface required by the imaging system 320.

C. CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An image sensor, comprising:

an event driven sensing array including one or more event vision sensor (EVS) pixels arranged in one or more EVS pixel rows, wherein each EVS pixel of the one or more EVS pixels is configured to capture event data corresponding to contrast information of light incident on the EVS pixel;

a pixel array including a plurality of CMOS image sensor (CIS) pixels arranged in one or more CIS pixel rows, wherein each CIS pixel of the plurality of CIS pixels is configured to capture CIS data corresponding to intensity of light incident on the CIS pixel;

a deblur circuit configured to generate deblurred image data by deblurring the CIS data captured by the plurality of CIS pixels using the event data captured by the one or more EVS pixels, wherein the deblur circuit includes a counter usable to compute a running sum of events detected in event data captured by an EVS pixel of the one or more EVS pixels during an event accumulation period; and a physical interface usable to output the deblurred image data from the image sensor.

2. The image sensor of claim 1, wherein the counter includes an integer counter.

3. The image sensor of claim 2, wherein the integer counter includes an up/down counter.

4. The image sensor of claim 1, wherein the counter is clocked by events in the event data captured by the EVS pixel during the accumulation period.

5. The image sensor of claim 1, wherein the deblur circuit further includes a buffer configured to store the running sum.

6. The image sensor of claim 1, wherein the deblur circuit further includes a product computation block configured to compute a product of the running sum by a contrast threshold parameter.

7. The image sensor of claim 6, wherein the deblur circuit further includes an exponential computation block configured to compute an exponential of the product.

8. The image sensor of claim 7, wherein the deblur circuit further includes an integration computation block configured to compute the integral of the exponential of the product over time.

9. The image sensor of claim 8, wherein the integration computation block is configured to continuously compute the integral over the event accumulation period.

10. The image sensor of claim 8, wherein the deblur circuit further includes a buffer configured to store results of the integral computed by the integration computation block.

11. The image sensor of claim 1, wherein:

the deblurred image data includes a latent frame of the CIS data;

the deblur circuit includes a latent frame computation block configured to compute the latent frame based at least in part on (i) first event data captured by an EVS pixel of an EVS pixel row of the one of more EVS pixel rows and (ii) first CIS data captured by a CIS pixel of a CIS pixel row corresponding to the EVS pixel row;

the first CIS data is captured by the CIS pixel over an exposure period; and the first event data is captured by the EVS pixel over an event accumulation period that is aligned with the exposure period.

12. The image sensor of claim 1, further comprising:

first row/column control circuitry and first readout circuitry, each corresponding to the pixel array; and second row/column control circuitry and second readout circuitry different from the first row/column control circuitry and the first readout circuitry, respectively, and each corresponding to the event driven sensing array.

13. The image sensor of claim 12, further comprising a common control block configured to synchronize operations of the first row/column control circuitry, the first readout circuitry, the second row/column control circuitry, and the second readout circuitry with one another.

14. The image sensor of claim 1, wherein:

the physical interface is a first physical interface; and the image sensor further includes a second physical interface separate from the first physical interface and usable to output the event data.

15. The image sensor of claim 1, wherein the physical interface is further usable to output the event data.

16. The image sensor of claim 1, further comprising a multiplexer that is controllable to selectively output the deblurred image data or the CIS data from the image sensor.

17. The image sensor of claim 1, further comprising a multiplexer that is controllable to selectively output the event data from the image sensor.

18. An imaging system, comprising:

an image sensor including— a plurality of CMOS image sensor (CIS) pixels configured to capture CIS data corresponding intensity of light incident on CIS pixels of the plurality of CIS pixels, an event vision sensor (EVS) pixel configured to capture EVS data corresponding to events detected in light incident on the EVS pixel, and a deblur circuit configured to generate deblurred image data based on the CIS data and an accumulation of events in the EVS data, wherein the deblur circuit is configured to compute the accumulation of events using an event-based double integral model; and an image signal processor configured to interface with the image sensor and receive the deblurred image data from the image sensor.

19. A method of operating an image sensor, the method comprising:

capturing CMOS image sensor (CIS) data using CIS pixels of one or more CIS pixel rows of a pixel array of the image sensor, wherein the CIS data corresponds to intensity of light incident on the CIS pixels over an exposure period;

capturing event vision sensor (EVS) data using one or more EVS pixels of an EVS pixel row of an event driven sensing array of the image sensor, wherein the EVS data includes events detected by the one or more EVS pixels during an event accumulation period, and wherein each event represents temporal contrast of light incident on the one or more EVS pixels that exceeds a threshold; and generating deblurred image data, wherein generating the deblurred image data includes deblurring, using a deblur circuit of the image sensor, the CIS data (i) based on the EVS data and (ii) internally within the image sensor.

20. The method of claim 19, further comprising aligning the exposure period and the event accumulation period in time.

21. The method of claim 20, wherein aligning the exposure period includes resetting the CIS pixels and the one or more EVS pixels such that the exposure period and the event accumulation period have a same start time.

22. The method of claim 21, further comprising resetting one or more buffers of the deblur circuit such that values stored in the one or more buffers are in a reset state at the same start time of the exposure period and the event accumulation period.

23. The method of claim 20, wherein aligning the exposure period and the event accumulation period includes aligning the exposure period and the event accumulation period such that the exposure period and the event accumulation period have a same end time.

24. The method of claim 19, further comprising reading the EVS data out from the one or more EVS pixels as part of a readout operation that cyclically scans the event driven sensing array EVS-pixel-row-by-EVS-pixel-row.

25. The method of claim 24, wherein the readout operation is configured to spend a preset amount of time at each EVS pixel row of the event driven sensing array to read out corresponding EVS data.

26. The method of claim 24, wherein the readout operation is configured to (a) spend a preset amount of time at each EVS pixel row of the event driven sensing array having at least one EVS pixel storing unread EVS data, and (b) skip over EVS pixels rows in which no EVS pixel is storing unread EVS data.

27. The method of claim 19, wherein generating the deblurred image data includes maintaining, over the event accumulation period, a running sum of events included in the EVS data.

28. The method of claim 27, wherein generating the deblurred image data further includes computing a product of the running sum with a contrast threshold parameter.

29. The method of claim 28, wherein generating the deblurred image data further includes computing an exponential of the product.

30. The method of claim 29, wherein generating the deblurred image data further includes computing an integral of the exponential over the event accumulation period.

31. The method of claim 30, wherein computing the integral includes continuously computing the integral over time during the event accumulation period.

32. The method of claim 19, wherein generating the deblurred image data includes accumulating the events included in the EVS data, and wherein the method further comprises discarding the EVS data after accumulating the events.

33. The method of claim 19, wherein generating the deblurred image data includes, at or after an end of the exposure period, reading the CIS data from the CIS pixels to the deblur circuit.

34. The method of claim 33, wherein the deblur circuit includes a latent frame computation block, and wherein reading the CIS data from the CIS pixels to the deblur circuit includes reading the CIS data from the CIS pixels to the latent frame computation block without first storing the CIS data in a CIS frame buffer.

35. The method of claim 33, wherein the one or more CIS pixel rows includes a plurality of CIS pixel rows, and wherein reading the CIS data from the CIS pixels of the plurality of CIS pixel rows to the deblur circuit includes reading the CIS data from the CIS pixels of the plurality of CIS pixel rows at a same time.

36. The method of claim 19, wherein deblurring the CIS data based on the EVS data includes computing a latent frame included in the CIS data.

37. The method of claim 36, wherein the latent frame corresponds to the intensity of light incident on the CIS pixels at a start time of the exposure period.

38. The method of claim 36, wherein the latent frame corresponds to the intensity of light incident on the CIS pixels at a time within the exposure period occurring after a start time of the exposure period.

39. The method of claim 19, further comprising outputting the deblurred image data from the image sensor without outputting the EVS data from the image sensor.

40. The method of claim 19, wherein:

the CIS data (i) captured using the CIS pixels and (ii) prior to the deblurring, is blurred CIS data; and the method further comprises outputting the deblurred image data from the image sensor without outputting the blurred CIS data.

41. The method of claim 19, wherein:

the CIS data (i) captured using the CIS pixels and (ii) prior to the deblurring, is blurred CIS data; and the method further comprises outputting the EVS data and/or the blurred CIS data.

42. The method of claim 19, further comprising, at an end of the event accumulation period, disabling the one or more EVS pixels from detecting further events.

* * * * *